(12) United States Patent
Greenwood et al.

(10) Patent No.: US 12,197,397 B1
(45) Date of Patent: Jan. 14, 2025

(54) OFFLOADING OF REMOTE SERVICE INTERACTIONS TO VIRTUALIZED SERVICE DEVICES

(71) Applicant: Amazon Technologies, Inc., Seattle, WA (US)

(72) Inventors: Christopher Magee Greenwood, Seattle, WA (US); Marc Stephen Olson, Bellevue, WA (US); Jacob Wires, Vancouver (CA); Andrew Kent Warfield, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 517 days.

(21) Appl. No.: 17/643,802

(22) Filed: Dec. 10, 2021

(51) Int. Cl.
*G06F 9/455* (2018.01)
*G06F 16/188* (2019.01)

(52) U.S. Cl.
CPC ........ *G06F 16/188* (2019.01); *G06F 9/45541* (2013.01); *G06F 9/45558* (2013.01); *G06F 2009/45579* (2013.01); *G06F 2009/45595* (2013.01)

(58) Field of Classification Search
CPC .............. G06F 16/188; G06F 9/45541; G06F 9/45558; G06F 2009/45579; G06F 2009/45595
See application file for complete search history.

(56) References Cited

U.S. PATENT DOCUMENTS

| | | | |
|---|---|---|---|
| 11,966,370 B1 | 4/2024 | Greenwood et al. | |
| 2007/0088702 A1* | 4/2007 | Fridella | H04L 61/4552 709/219 |
| 2007/0233880 A1* | 10/2007 | Nieh | H04L 67/142 709/227 |
| 2019/0124084 A1* | 4/2019 | Pieczul | H04L 67/06 |
| 2020/0293499 A1* | 9/2020 | Kohli | H04L 67/1097 |
| 2021/0303530 A1 | 9/2021 | Dai et al. | |

* cited by examiner

*Primary Examiner* — Dong U Kim
(74) *Attorney, Agent, or Firm* — Knobbe, Martens, Olson & Bear, LLP

(57) ABSTRACT

Systems and methods are provided for handling file operations from a hosted computing instance via a secure compute layer. The secure compute layer is presented to the instance as a virtualized service device that is locally addressable by the instance. Software within the instance can submit file operations to the virtualized service device, which the secure compute layer can translate into calls to a network-accessible storage service. Results from the calls can then be passed back to the instance through the virtualized service device. As a result, the instance can communicate with a variety of different network services, without itself implementing network communications for those services.

19 Claims, 8 Drawing Sheets

OFFLOADING OF REMOTE SERVICE INTERACTIONS TO VIRTUALIZED SERVICE DEVICES

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources. These virtual machines may carry out a wide variety of functionalities otherwise possible on a non-virtualized hardware device, such as invoking network-accessible services, conducting data processing, and the like. While creation and maintenance of a virtual machine may be externally handled on a host computing device, the internal configuration of a virtual machine (such as creation and maintenance of an operating system, software applications, and the like) is often handled by an administrator of the virtual machine, which may be different than the administrator of the host device. Thus, the virtual machine may in some cases represent a "black box" from the point of view of a host device. This attribute can provide for increased privacy and security. At the same time, this attribute may cause difficulties in ensuring consistent operation among virtual machines. For example, different virtual machine administrators may choose to execute different versions of software within their respective virtual machines, which in turn may require external services to provide support for such different software versions.

DETAILED DESCRIPTION

Figure 1:
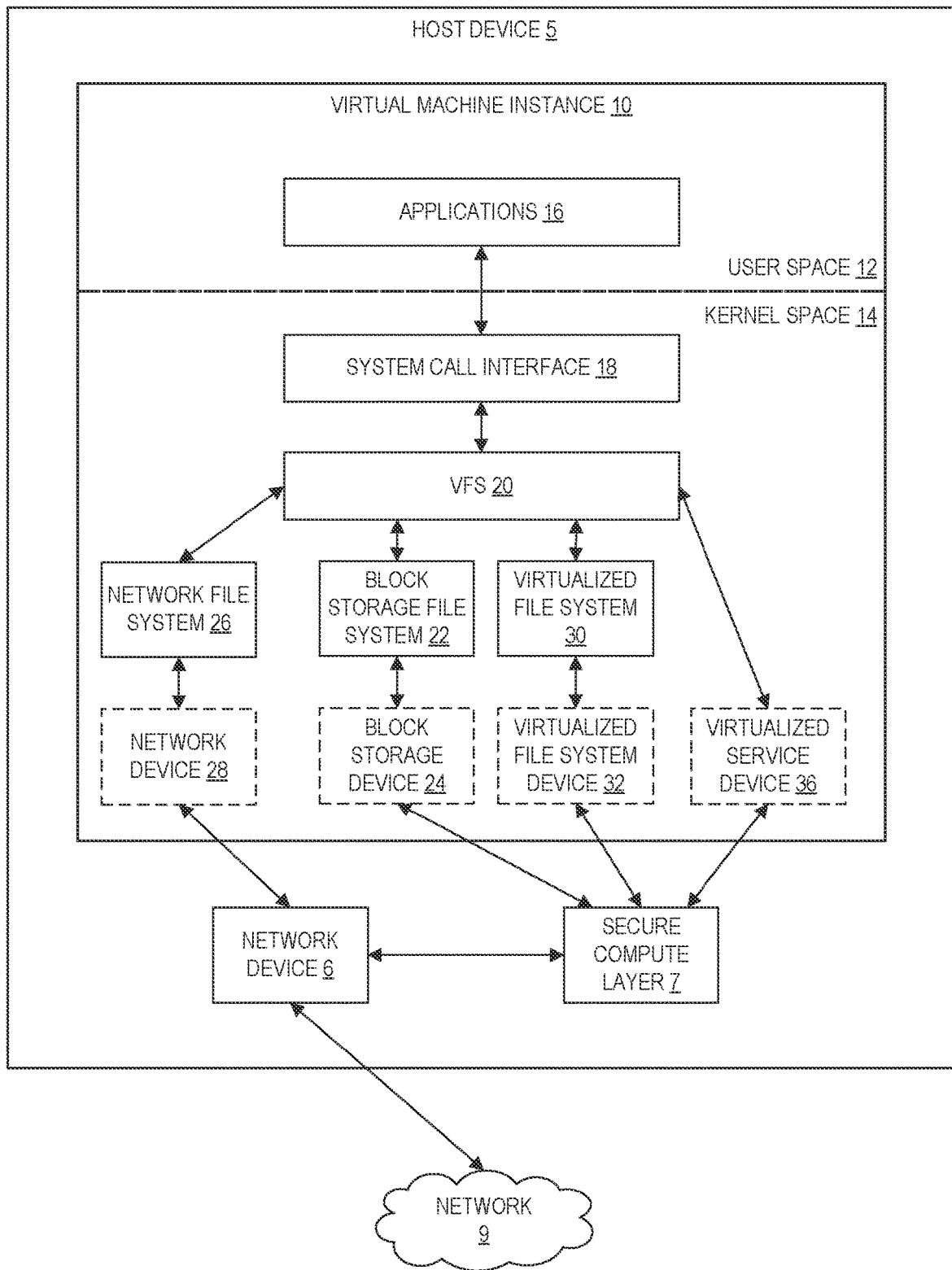
FIG. 1 depicts a logical model of communications between various elements of a host device to enable code executing on a virtual machine instance to interact with network-based services via interactions with a locally-accessible virtualized service device provided by a secure compute layer external to the instance.

Generally described, aspects of the present disclosure relate to offloading of remote service interactions to virtualized service devices. Specifically, rather than transmitting calls over a network to a network-accessible service, embodiments of the present disclosure can represent a network-accessible service as a virtualized service device within a client computing device, which virtualized service device is in turn backed by a secure compute layer distinct from the client computing device. To interact with the network accessible service, software executing on the client computing device may write to and read from the virtualized service device, in a manner similar to interacting with other local devices. The virtualized service device, in turn, may interact with the network accessible service in order to process client requests and return results. As discussed below, interactions with the virtualized service may occur via a set of standardized system calls, such as file operations natively supported by an operating system of a client computing device. Accordingly, there may be little or no change in abstraction (or corresponding loss of context) between system calls submitted by software application and corresponding data passed to a virtualized service device. As a result, the embodiments disclosed herein provide for improvement on alternative techniques, such as virtualization of pre-existing physical devices, where loss of context and a change in abstraction may occur in internal processing that facilitates interaction with the physical device (or a virtualized analog thereof). Moreover, the embodiments disclosed herein can enable all or substantially all processing to handle system calls to occur outside of a client computing device. Accordingly, that processing may be modified independent of operation of the client computing device, without requiring for example updates to drivers or other software within the client computing device. Thus, by offloading of remote service interactions to virtualized service devices via standardized system calls, embodiments of the present disclosure can provide for client computing devices to access a wide variety of network-accessible services via a simplified, standardized system call interface.

Typically, computing devices access remote services via a network interface. For example, a computing device may access a remote service by generating and transmitting network packets representing a request to a remote device via a network, and then receiving and decoding network packets representing a response. Because network communications can support a wide variety of protocols and formats, both devices communicated over a network must generally agree on the type and format of packets exchanged. Thus, any attempt to modify a format or protocol of network communications generally requires alteration of software within a client computing device. These formats and protocols tend to change rapidly as new technology develops. Moreover, because network communication entails significant complexity, various layers of abstraction are typically placed between code attempting to interact with a remote service and actual transmission of network data. For example, an initial request may generate a network packet, which is then converted into network frame, which is then transmitted over a network interface to the remote service. Each level of abstraction is typically handled by a distinct software process implemented on a client computing device, leading to complexity, difficulty in upgrading such software, and a potential loss of contextual information between abstract levels.

In contrast to network communications, interactions with local devices often operate on a fairly stable set of system calls, relying on device drivers on a client device to translate these system calls into appropriate actions for a device. For example, LINUX™ and other Unix-like operating systems adopt an "everything is a file" philosophy, in which both data files and local devices are represented as file descriptors. Interactions with data files and local devices can then utilize a common set of file operations, regardless of the format of the data file or type of local device. The operating system accepts these file operations through a system call interface, and passes these operations to an appropriate device driver for delivery to the device. These file operation system calls are therefore a relatively stable and unified mechanism for interacting with a wide variety of devices.

Embodiments of the present disclosure leverage native file operation system calls of an operating system to provide for unified access to network-accessible services. Specifically, as disclosed herein, a network service may be represented as a virtualized service device on a client computing device. In one embodiment, the virtualized service device corresponds to a secure compute layer, implemented on (for example) a host device hosting a virtualized client computing device or on an "offload" card, such as an extension card installed on the client computing device (or a host device thereof) that provides for secure computation. A file system driver can facilitate direct passing of system calls, such as file operations, to the virtualized service device and thus to the secure compute layer. The secure compute layer can then process these system calls and provide a response to the file system driver and, in turn, to software executing on the client computing device. For example, the secure compute layer may initialize a connection to a network service, submit a call to the network service corresponding to an obtained system call, receive a request to the network service call, and return that response to the driver as a response to the system call. In this way, software executing on a client computing device may interface with the network service transparently, in the same manner as accessing local data files or devices. Accordingly, software complexity within the client computing device is significantly reduced, as such complexity is effectively offloaded to the secure compute layer.

The embodiments described herein provide a number of advantages over alternative approaches. For example, in addition to reducing complexity and providing a simplified interface, embodiments of the present disclosure can provide for increased security relative to, for example, relying on network communications generated internally to a client computing device. Illustratively, secure network communications may rely on encryption or other techniques to inhibit manipulation of the communications by an unknown party. Encrypting and decrypting such communications (in addition to other operations, such as ensuring access to correct encryption environment) can require significant computing resources. Moreover, a sending device (e.g., the client computing device) must generally be aware of the receiving device and the encryption expected by that receiving device—otherwise, encryption conducted by the client computing device may by design inhibit reception and handling of communications by an external device. Embodiments of the present disclosure remove the need for such encryption and decryption between a client computing device and an external processing device (e.g., a secure compute layer), by providing for local communication between those devices. Moreover, embodiments of the present disclosure provide for secure intermediary processing—by a device logically disposed between a client computing device and a network-accessible service—in a manner that may not be possible via secure network communications absent knowledge of the intermediary device by the client computing device.

Still further, network communications between the external processing device and network-accessible services may occur with increased security relative to communications from a client computing device. As an illustration, assume that both a secure compute layer and a network service are implemented by mutually trusted participants (or a single a common entity or operator), while the client computing device is implemented by one of the trusted participants but on behalf of a potentially untrusted participant. In such a scenario, network communications from the client computing device may be subject to rigorous security requirements, since they may be generated by untrusted code executing on the client computing device. In contrast, network communications from a secure compute layer may be trusted, as they occur based on code executing within an environment under control of a trusted participant. Thus, such communications may be processed more efficiently than untrusted communications, as they may (for example) bypass security checks or other processing required for general access to a service.

Somewhat similarly, because embodiments disclosed herein enable code translating system calls to network calls to be implemented outside of a client computing device, an operator of a virtualization system is provided further ability to modify that code without inhibiting privacy of client computing devices. For example, one alternative mechanism for accessing network services is to provide a software development kit (SDK) to client computing devices that provides access to the service at a high level of abstract by, e.g., accepting calls to the service, translating such calls into network communications, handling those network communications, parsing responses, etc. A common issue with providing such SDKs is a need to maintain compatibility with multiple versions. For example, when an SDK is updated to a new version (e.g., to provide new functionality or fix bugs), it is likely that at least some client computing devices using a prior version of the SDK do not update to the new version. Moreover, to ensure privacy and security, it may not be possible for the operator of the service to update the SDK within the client computing devices, even when that operator may also be providing the client computing devices to a third party. Accordingly, to avoid rendering the service inaccessible to those computing devices, a service is often forced to allow the use of non-current SDKs. In contrast, where processing that would otherwise occur in an SDK is instead implemented at a secure compute layer outside of the client computing devices, code to implement that processing may be updated by an operator of the secure compute layer, without negatively impacting privacy or security of the client computing device.

Moreover, by providing for processing externally to a client computing device, embodiments of the present disclosure can provide increased modularization of client computing device functions. Illustratively, code within a client computing device may typically implement desired functionality by interaction with a network-accessible service, which may require the code to both implement the desired functionality and implement communication with the network-accessible service (e.g., via client-supplied security information). Because embodiments of the present disclosure can provide for handling of communications with a network-accessible service via a secure compute layer, these two functionalities may be beneficially disassociated. For example, an application developer may author code for execution on a client computing device irrespective of how network communications are handled with a network-accessible service. A systems administrator may then provide configuration information (e.g., security information) to the secure compute layer to provide for secure network communications to the network-accessible service. Accordingly, management of client computing devices is simplified.

Still further, by providing for defined, secure access to network-accessible services via a locally addressable device, security concerns internally to a client computing device may be reduced. For example, a common concern with a client computing device may be accessibility to malicious actors via a network. Because embodiments of the present disclosure provide for access to network-accessible services via locally addressable devices, a client computing device may in some instances be configured to lack network access without inhibiting access to the network-accessible services. For example, in one embodiment, a client computing device may be configured without the ability to itself generate network communications (e.g., without a network interface card), and may be provided with access to a limited set of network-accessible services via one or more locally accessible devices corresponding to such services.

In addition to generating network communications within a client computing device, another alternative to providing some network-accessible services is to provide for virtualization of pre-existing physical devices. For example, a cloud-based block storage service may provide for virtualized block storage devices, which operate (from the point of view of a client computing device) analogously to a physical hard disk drive (HDD) or solid-state drive (SSD). For example, a virtualized block storage device may accept commands formatted in a common mass storage protocol such as serial ATA ("SATA"), convert those commands into network communications with a block storage service, handle those network communications, parse a response from the network service, and return a response in the mass storage protocol to software executing on the client computing device. A benefit of this technique relative to direct network communications is that a client computing device need not be aware that any network communications have occurred—it may instead appear, from the point of view of that device, that interactions are occurring with a physical storage drive. However, a detriment of this technique relative to the presently disclosed embodiments is that translation occurs between system calls, as submitted by software on a client computing device, and the corresponding calls made via the mass storage protocol. For example, calls to read from or write to a file may be translated into commands to read or write specific block ranges on the block storage device. This results in a loss of contextual information that is not stored on the block device, such as the name of the file being read or written. In effect, access to services through virtualized versions of pre-existing physical devices is often limited by the protocols and interfaces provided for such pre-existing physical devices. Moreover, such access is still reliant on drivers or similar software executing within a client computing device to facilitate interaction with of pre-existing physical devices.

Embodiments of the present disclosure address these problems by removing a need for a change in abstraction (and corresponding potential loss of context) between system calls and corresponding data passed to a virtualized service device. For example, rather than a cloud-based block storage system providing for virtualized block storage device, the cloud-based block storage system may provide virtualized file system devices that directly accept file operations (e.g., creating, reading, updating and destroying files, changing file permissions, and the like). These file operations may then be processed within a secure compute layer that implements the file system. Because the file system is implemented in the secure compute layer, rather than within the client computing device, the functionality of the file system is not limited by software executing in the client computing device. For example, the file system is not limited to standardized file systems supported by common operating systems, such as ext4 or file allocation table (FAT) file systems. Instead, the file system may implement a wide variety of functionalities not constrained by the operating system of the client computing device. For example, the file system may act as a proxy for multiple cloud storage services, storing different files in different services as desired by the file system. Illustratively, a first type of file may be stored within a volume of a cloud-based block storage service, another within a cloud-based object storage service, and a third within an archival cloud-storage service. Thus, network services are enabled to directly accept and handle system calls from software executing on a client computing device, without requiring the client computing device to be aware that such calls are being passed to or handled by a network service.

As will be appreciated by one of skill in the art in light of the present disclosure, the embodiments disclosed herein improve the ability of computing systems, such as host devices for virtual machine instances, to interact with network-based services. Moreover, the presently disclosed embodiments address technical problems inherent within computing systems; specifically, the limited ability of a host device to modify operation of a virtual machine instance without impairing security and privacy of that virtual machine instance, and the complexity and inefficiency of internally configuring a virtual machine instance, and particularly untrusted code executed within a virtual machine instance, to interact with network-based services. These technical problems are addressed by the various technical solutions described herein, including the use of virtualized service devices to accept calls to a network-based service as system calls from code executing on a virtual machine instance, relieving a need for the code to be aware that such calls are handled by a network-based service. Thus, the present disclosure represents an improvement in host devices and computing systems in general.

The foregoing aspects and many of the attendant advantages of this disclosure will become more readily appreciated as the same become better understood by reference to the following description, when taken in conjunction with the accompanying drawings.

FIG. 1 depicts a logical model of communications between various elements of a host device 5 to enable code executing on a virtual machine instance 10 to interact with network-based services. Specifically, FIG. 1 depicts a number of different potential channels for interacting with network-based services, including use of a virtualized network device 28, a virtualized block storage device 24, a virtualized file system device 32, and a virtualized service device 36, each discussed in more detail below.

In FIG. 1, the virtual machine instance 10 represents virtualized hardware executing on a host device 5, which may be a physical computing device or may itself be a virtual computing device executed on a physical computing device. The virtual machine instance 10 therefore has many or all components and attributes of a true physical computing device, such as a processor, memory, and the like (though of course, unlike a true physical computing device, each such component may be virtual). Accordingly, the virtual machine instance 10 may execute an operating system and enable execution of code within that operating system, such as in the form of applications 16. As is typical of many operating systems, a memory space of the virtual machine instance 10 is divided into two sections: user space 12 and kernel space 14. User space 12 illustratively represents a portion of memory (e.g., virtual memory of the operating system) where non-privileged code, such as applications 16, execute. Kernel space 14, in contrast, represents a portion of memory where privileged code, such as the operating system's kernel, kernel extension, and device drivers execute.

Typically, all interactions between applications 16 and hardware devices must pass through kernel space 14. To facilitate such interactions, the virtual machine instance 10 provides a system call interface 18, where applications 16 (or code associated with applications 16, such as libraries, utilities, etc.) can submit system calls. The particular system calls may vary according to the operating system, but are typically standardized within that operating system or operating system family. For example, system calls may be the same or similar across Linux distributions. Illustratively, in Linux and other Unix-like operating systems, both data and device interactions may be handled primarily as file interactions (leading to the simplification that "everything is a file" in such operating systems). Accordingly, a common set of file operation system calls (such as "open," "close," "read," "write", "modify permissions," "get status," etc.) may be used to interact with a wide variety of data files and devices.

To facilitate file operations, the virtual machine instance 10 can include a virtual filesystem 20, or ("VFS", sometimes also referred to as a "virtual file system switch"). The VFS 20 can accept system calls from the system call interface 18 and handle the call as appropriate for a target file or device. For example, each file on an operating system can be associated with a particular file system (e.g., FAT, ext4, NFS, etc.). Thus, the VFS 20 can handle a system call to conduct an operation of a file by invoking code corresponding to an implementation of the file operation within the file system of the file. For example, a call to "open" a file on a FAT file system may result in invocation of code, for the FAT file system, implementing an "open" operation. Similarly, a call to "open" a file on an ext4 file system can result in invocation of code for the ext4 file system implementing an "open" operation. Accordingly, standardized file operations submitted to the VFS 20 are translated into corresponding operations specific to the appropriate file system.

In addition to file systems, the VFS 20 can facilitate direct interactions with devices, such as block devices (which may be mounted as a file system and thus be used to store files) and character devices. Each device may be represented as a file addressable by the VFS 20, and thus file operations may be passed to a device. For example, the VFS 20 may enable reading from or writing to a data stream representing an input/output device.

The specific file systems and files accessible by the VFS 20 are shown in FIG. 1 as a distinct logical layer. As shown in FIG. 1, the VFS 20 can interact with a variety of different file systems, including a network file system 26, a block storage file system 22, and a virtualized file system 30. In FIG. 1, each file system represents a different manner of facilitating interaction with a network service. In addition, the VFS 20 can further directly interact with a virtualized service device 36, which enables interaction with a corresponding network service.

Specifically, the Network File System 26 represents a file system accessible via the NFS protocol, as known in the art. Accordingly, interactions with files stored on the network file system 26 are passed to code within the kernel space 14 facilitating interaction with a remote NFS server. Interaction with NFS servers is known in the art and will thus not be described in detail herein. However, in brief, interaction may include encapsulating file operations into network communications, which are then transmitted over a network (shown in FIG. 1 as network 9, which may represent any variety of networks, similarly to network 104 described in more detail below) to the NFS server. To facilitate network transmissions, the virtual machine instance 10 can include a virtualized network device 28, which in turn corresponds to a network device 6 on the host device 5 (e.g., a physical network interface). Because use of the network file system 26 requires file operations to be encapsulated into network packets at the virtual machine instance 10, these interactions can be relatively complex. For example, they may require that both the instance 10 and a corresponding server implement compatible versions of the NFS protocol, that the instance 10 maintains up-to-date drivers for the network device 28, that the instance 10 properly authenticates with the NFS server, etc. Moreover, the instance 10 may in some cases not support use of the network file system 26 for various operations, or may limit use cases for the network file system 26 based on the complexity of interactions with the remote NFS server. For example, the instance 10 may be unable to mount the network file system 26 as a root filesystem without specialized software to support such an operation.

On alternative to the network file system 26 that maintains an ability to interact with a remote network service is use of a virtualized block storage device, such as block storage device 24. Illustratively, the host device 5 may include a secure compute layer 7, which represents code executing outside of the instance 10, such as on an operating system (e.g., a hypervisor) of the host device 5 or within a distinct execution environment of the host device 5. For example, the secure compute layer 7 may be provided by an "offload" card, such as an expansion card installed within a physical host device 5 that provides for secure computation using a distinct processor and memory provided by the expansion card. For example, in some implementations, at least a subset of virtualization management tasks for the host 5 may be performed at one or more offload cards so as to enable more of the processing capacity of the host 5 to be dedicated to client-requested compute instances—e.g., cards connected via PCI or PCIe to the physical CPUs and other components of the virtualization host 5 may be used for some virtualization management components. Such an offload card of the host 5 can include one or more CPUs (or other processing units) that are not available to customer instances, but rather are dedicated to instance management tasks such as virtual machine management, input/output virtualization to network-attached storage volumes, local migration management tasks, instance health monitoring, and the like.

In one instance, the secure compute layer 7 may be presented to the virtual machine instance 10 as block storage device 24, and thus facilitate interactions as would a physical block storage device installed on the host device 5. For example, the secure compute layer 7 may provide an NVM Express (NVMe) compliant interface through which the virtual machine instance 10 can read and write blocks of a block storage device. The secure compute layer 7 may include code executable to translate such block operations to operations on a network service, such as a cloud-based block storage service, and to conduct such operations. Thus, file operations submitted to the VFS 20 may be passed to a block storage file system 22, which is configured to convert such operations to corresponding block operations and pass these operations to the block storage device 24. In contrast to the network file system 26, use of a virtualized block storage device 24 may enable the instance 10 to interact with the network service in the same manner as a local block device and without requiring networking support within the instance 10. This may in turn simplify operation of the instance 10, removing issues that may exist, for example, with network drivers of the instance 10, with incompatible protocol implementations, or the like.

Use of a virtualized block storage device 24 may be beneficial in that it allows use of a network-based block storage device in the same manner as a local block storage device, based on for example, the same block storage file system 22 as would be used for such a local block storage device. However, the processing that occurs within a block storage system 22 generally represents a significant change in a level of abstraction, modifying file operations in a manner that removes significant context. For example, because the block storage devices 24 stores data in blocks, commands transmitted to the block storage devices 24 may correspond to commands to read and write specific bytes to specific locations of the block device 24, without information such as the specific file being read from or written to. Illustratively, the block storage file system 22 may obtain a request to read from or write to a file by a file identifier (e.g., a file name and location within a directory structure), identify a particular file system object (e.g., inode) corresponding to the file identifier, identify a particular set of blocks on the block storage device 24 (e.g., as a set of logical block addresses, or "LBAs"), and then submit commands to the block storage device 24 to read from or write to the set of blocks. As such, contextual information such as the file being written to or read from and its location within the block storage file system 22 are not made available to the block storage device 24. Moreover, this processing by the block storage file system 22 may entail multiple interactions with the block storage device. For example, identifying a particular file system object (e.g., inode) corresponding to the file identifier and identifying a particular set of blocks on the block storage device 24 (e.g., as a set of LBAs) may themselves require reading from the block storage device 24. In the context of a virtualized block storage device as shown in FIG. 1, this can result in both significant processing occurring within the instance 10 (and thus in a manner invisible to the host device 10) and in a larger number of "round trips" on the network 9, substantially decreasing performance of the block storage device 24.

Embodiments of the present disclosure address the difficulties noted above with respect to network file systems and virtualized block storage devices 24. Specifically, embodiments of the present disclosure can facilitate interaction with a network-accessible service by use of a virtualized file system device 32 or virtualized service device 36. As discussed in more detail below, both the virtualized file system device 32 and virtualized service device 36 may represent virtualized devices corresponding to the secure compute layer 7. Accordingly, the virtualized file system device 32 and virtualized service device 36 may differ primarily in how they are used by the instance 10, with the virtualized file system device 32 supporting a virtualized file system 30 and the virtualized service device 36 providing direct access to a network-accessible service via file operations, and thus supporting a wide variety of operations on that service (potentially including implementation of a virtualized file system 30).

Both the virtualized file system device 32 and the virtualized service device 36 may be represented within the kernel space 14 as a file. For example, both the virtualized file system device 32 and the virtualized service device 36 may be represented in a root file system of the instance 10 as a device file in the "/dev/" directory, such as "/dev/foo" and "/dev/bar." The virtualized file system 30 may facilitate file system operations by interactions with the device file, while applications 16 may read from and write to a network service by reading from and writing the device file representing to the virtualized service device 36, which in turn corresponds to the network service.

Each of the virtualized file system device 32 and virtualized service device 36 may be represented as a pair of queues supported by or accessible to the secure compute layer 7. For example, each of the virtualized file system device 32 and virtualized service device 36 may be represented as a command queue on the secure compute layer 7, corresponding to a memory location at which the instance 10 can submit commands, and a response queue on the secure compute layer 7, corresponding to a memory location at which the instance 10 can read responses to those commands. These queues may be referred to as a "queue pair." In one embodiment, the queue pair supports remote procedure call (RPC) commands to a corresponding network service, which service may vary according to the virtualized file system device 32 and virtualized service device 36.

For example, in the case of the virtualized file system 32, the secure compute layer 7 may be presented to the instance 10 as a virtualized file system device 32 (e.g., "/dev/foo"). Issuing a "mount" command to the virtualized file system device 32 may cause the secure compute layer to authenticate with a remote network storage service (e.g., preconfigured for the instance 10), and may provision a new queue pair on the secure compute layer 7 that is cryptographically bound to an authenticated session with the remote network storage service. The mount operation may result in creation of the virtualized file system 30 at an appropriate mount point of the instance 10 (e.g., a root mount point). For example, the mount may illustratively specify a "virtualized file system" format for the virtualized file system device 32, which instructs the VFS 20 to utilize code corresponding to the virtualized file system 30 when interacting with the virtualized file system 30.

In one embodiment, the virtualized file system 30 is a "thin" file system. In contrast to a block storage file system 22, the virtualized file system 30 may conduct little or no processing, and instead submit file operations directly from the VFS 20 to the virtualized file system device 32 without a change in abstraction of such operations. For example, a command to read a given file (e.g., "read('/foo/bar')") within the mounted virtualized file system 30 may cause the virtualized file system 30 to write the command to the command queue of the virtualized file system device 32 (e.g., as "read('/foo/bar')"). As a result, little or no processing is required at the virtualized file system 30, no context is lost, and only a single operation is required from the point of view of the instance 10. On receiving such a command, the secure compute layer 7 may submit the command to the corresponding network storage service, obtain a response, and enqueue the response to the response queue for the virtualized file system device 32. The virtualized file system 30 may then read the response from the response queue and provide the response to the calling application 16. Accordingly, applications 16 are enabled to interact with a network service without either implementing network communications (as in the case of the network file system 26) or handling translation of file operations to block operations (as in the case of the block storage device 24).

The virtualized service device 36 may operate similarly to the virtualized file system device 32, but without presentation to applications 16 as a virtualized file system 30. Accordingly, rather than mount the virtualized service device 36, applications 16 may be configured to directly read from and write to the virtualized service device 36. The kernel space 14 may include a "thin driver" for the device 36, which accepts file operations for the device 36 and enqueues a corresponding operation into a queue for the device 36. The compute layer 7, in turn, may process the command according to a network service bound to the device 36, and enqueue a response in the response queue for the device 36, thus facilitating interactions with the service by applications 16.

As an example, assume that an instance 10 is configured to facilitate interactions with a serverless compute service—a network service that enables users to submit user-defined code and later call for execution of that code on-demand to obtain a result. Typically, invocation of serverless code may require formation of one or more network packets within the instance 10 and transmission of the packets across a network (e.g., network 9) via a network device (e.g., device 28). In contrast, embodiments of the present disclosure can enable binding of that serverless compute service to a particular virtualized service device 36. For example, a configuration of the instance 10 may specify a particular account on the serverless compute service to associated with a virtualized service device 36, and launching of the instance 10 may trigger the secure compute layer 7 to establish a connection to the serverless compute service authenticated to that account. Thereafter, applications 16 may be enabled to invoke execution of a particular function on the serverless compute service by writing to the virtualized service device 36. For example, invoking the serverless function "foo" may be accomplished by submitting the file operation "write(foo)" to the virtualized service device 36. On detecting the file operation within the command queue for the virtualized service device 36, the secure compute layer 7 may submit a corresponding invocation to the secure compute service, invoking the function "foo." The layer 7 may enqueue a response from the serverless compute service into the response queue for the virtualized service device 36, where it may be read by the application 16. Accordingly, applications 16 may be configured to interact with the serverless compute system in a "native" manner, without themselves handling, for example, network communications, authentication, and the like.

A number of benefits flow from the use of virtualized file system devices 32 and virtualized service devices 36 to provide accessible to network storage or other network services. As can be seen from the description above, because interactions can occur at the level of file operations, the processing required within an instance 10 to interact with these network services is significantly reduced. Moreover, because processing has been offloaded to the secure compute layer 7, code facilitating that processing may be controlled by an operator of the host device 5, rather than an operator of the virtual machine instance 10. Accordingly, that code may be modified without inhibiting the privacy or security of the instance 10.

Moreover, use of virtualized file system devices 32 and virtualized service devices 36 enables the relationship between an instance 10 and a network service to be modified without modifying code within the instance 10, such as by modifying a configuration of the instance 10. For example, assume that an owner of an instance 10 initially configures an application 16 to utilize a first serverless compute system, and later wishes to instead utilize a second serverless compute system. Traditionally, the owner may be required to modify the application 16 (or code supporting the application 16), such as by installing and SDK for the second serverless compute system, modifying calls within the application 16 to confirm to an application programming interface (API) of the second serverless compute system, or the like. On the other hand, when utilizing a virtualized service device 36, the particular serverless compute system may be specified within configuration of the instance 10. Accordingly, modifying that configuration to refer to the second serverless compute system rather than the first cause any applications 16 interacting with the device 36 to seamlessly interact with the second serverless compute system. Similarly, movement of data to a new network storage system would not require a reconfiguration of the instance 10, but may instead be accomplished by a modification of the virtualized file system device 32 (e.g., as set in a configuration of the instance 10) to "point" to the new network storage system. In this way, network services are effectively abstracted away from the point of view of the instance 10, simplifying operation of the instance 10 significantly.

While FIG. 1 depicts a virtual machine instance 10 implemented on a host device 5, some embodiments of the present disclosure may be implemented on a non-virtualized (or "bare metal") computing instance. For example, the secure compute layer 7 may be implemented on an expansion card installed into a non-virtualized computing device representing the bare metal instance, which card maintains an independent network connection to a network (e.g., network 9). In a similar manner to as described above, the layer 7 may be represented to the bare metal instance as one or more devices, and the bare metal instance may therefore interact with network services by conducting file operations on the devices. Thus, embodiments of the present disclosure can be implemented on both virtual and non-virtual devices. Because bare metal instances can be configured and dynamically deployed within a hosted service environment in a manner similar to virtual machine instances, bare metal instances and virtual machine instances are collectively referred to herein as "hosted computing instances."

Figure 2:
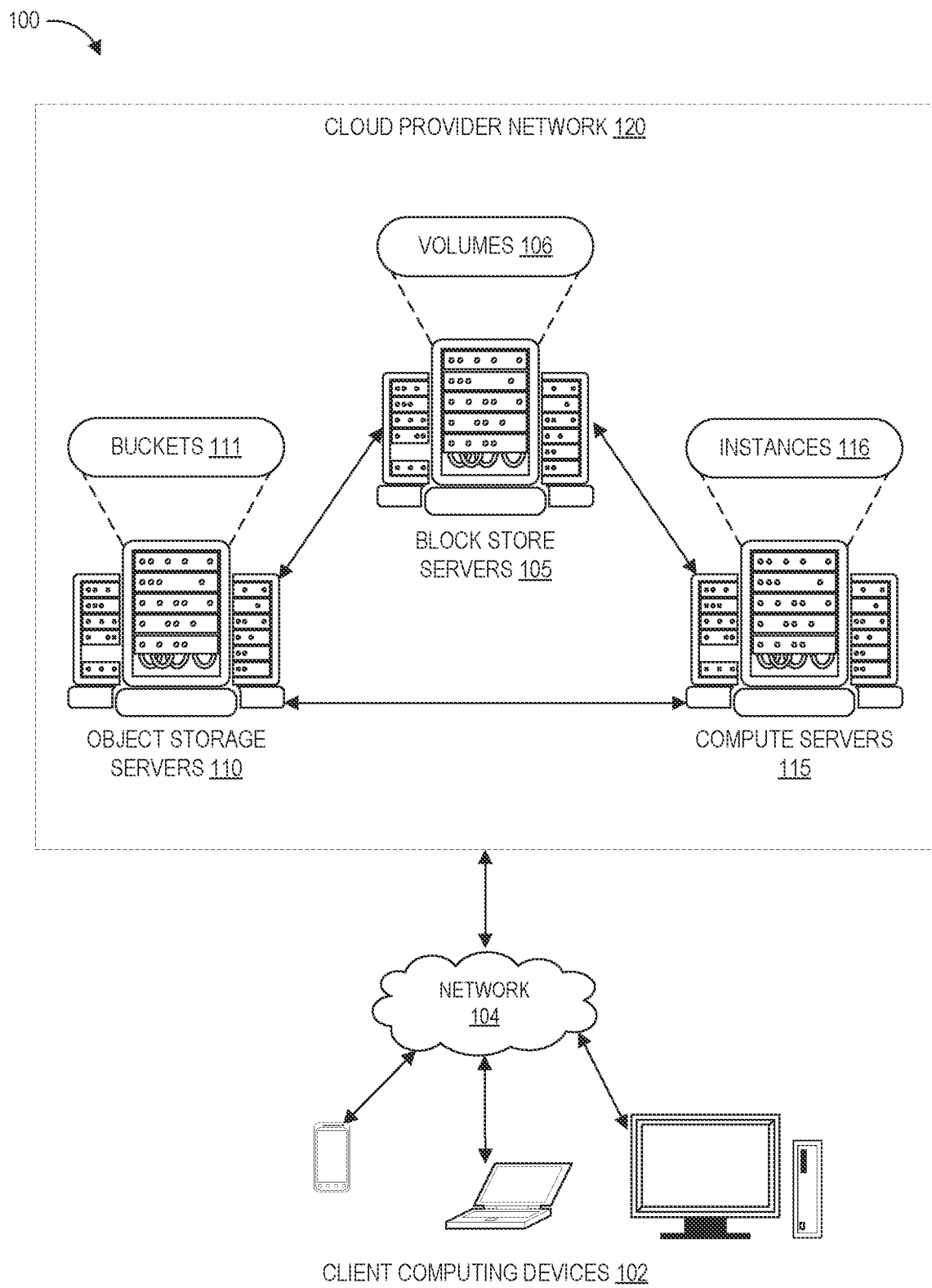
FIG. 2 depicts an example computing environment including a cloud provider network in which embodiments of the present disclosure can be implemented.

To provide additional context regarding example implementations of an instance, such as instance 10, and network services, FIG. 2 depicts an example computing environment 100 including a cloud provider network 120 in which embodiments of the present disclosure can be implemented. The cloud provider network 120 can be accessed by client computing devices 102 over a network 104. A cloud provider network 120 (sometimes referred to simply as a "cloud"), refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

The cloud provider network 120 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

In FIG. 2, the cloud provider network 120 includes one or more block store servers 105, one or more object storage servers 110, and one or more compute servers 115 that are in networked communication with one another and with the network 104 to provide users with on-demand access to computing resources including volumes 106, buckets 111, and instances 116, among others. These particular resources are described in further detail below. Some implementations of cloud provider network 120 can additionally include domain name services ("DNS") servers, relational database servers, servers providing serverless computing services, and other server services (not illustrated) for supporting on-demand cloud computing platforms. Each server includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can provide on-demand, scalable computing platforms to users through the network 104, for example allowing users to have at their disposal scalable "virtual computing devices" via their use of the block store servers 105, object storage servers 110, and compute servers 115. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

The cloud provider network 120 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Turning specifically to the roles of the different servers within the cloud provider network 120, the compute servers 115 include one or more servers which provide resizable computing capacity to users for building and hosting their software systems. The compute servers 115 and associated control plane functionality can provide an elastic compute cloud service of the cloud provider network. Compute services can be referred to as a virtual compute service, or cloud compute service, in various implementations. Users can use the compute servers 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs. The compute servers 115 can also include computer storage for temporary data used while an instance is running, however as soon as the instance is shut down this data may be lost. In example embodiments, host device 5 of FIG. 1 corresponds to a compute server 115, while virtual machine instance 10 corresponds to an instance 116.

The block store servers 105 provide persistent data storage for the compute servers 115 in the form of block storage volumes 106, each of which represents a virtualized, network-accessible block-storage device (e.g., a virtual "hard disk"). Block storage may be referred to in various implementations as cloud disks service, a managed disk service, a storage area network service, a persistent disk service, or a block volumes service, while block storage volumes may variously be referred to as cloud disks, storage disks, cloud volumes, disks, block volumes, or simply "volumes." The block store servers 105 and associated control plane functionality can provide an elastic block store service of the cloud provider network 120. Data of volumes 106 may be encrypted or unencrypted. Network-accessible block-storage devices may in some cases be end-user-accessible, for example by acting as a virtual disk drive for a virtual machine instance. In other instances, network-accessible block-storage devices may not be end-user accessible, but may be used to provide services to end users. For example, one or more network-accessible block-storage devices may be used as non-accessible recovery devices, supporting recovery to end-user-accessible block-storage devices.

The block store servers 105 include one or more servers on which data is stored as blocks. A block is a sequence of bytes or bits having a fixed length of the block size. Blocked data is normally stored in a data buffer and read or written a whole block at a time. Blocking can reduce overhead and speed up the handling of the data-stream. Each block is assigned a unique identifier by which it can be stored and retrieved, but typically is not assigned metadata providing further context. A block of data (also referred to herein as a "data block") can be, for example, 512 bytes, 1 kilobyte ("kB"), 4 kB, 8 kB, 16 kB, 32 kB, 64 kB, 128 kB, 256 kB, 512 kB, or larger, depending upon the implementation.

Volumes 106, which can be treated as an individual storage drive ranging for example from 1 GB to 100 terabytes TB (or more) in size, are made of one or more blocks stored on the block store servers 105. Although treated as an individual storage drive, it will be appreciated that a volume may be stored as one or more virtualized devices implemented on one or more underlying physical host devices. Volumes 106 may be partitioned a small number of times (e.g., up to 16) with each partition hosted by a device of the cloud provider network 120 that has the ability to transfer data at around 1 GB per second ("Gbps") in some implementations. These volumes provided persistent, dedicated storage that can be attached to particular instances of the compute servers 115. The block store servers 105 may have built-in redundancy for volumes by replicating the volume across multiple servers within an availability zone, which means that volumes will not fail if an individual drive fails or some other single failure occurs.

Each volume may be "attached" to an instance 116 running on a compute server 115, and can be detached from that instance 116 and re-attached to another. Attachment between a volume and an instance refers to the establishment of a connection between the instance—or other software or hardware acting on behalf of the instance—and the volume. This connection may be referred to as a "lease" in some implementations, and it enables to instance to view the volume as if it were a local storage drive, even though the volume and instance may be hosted on different physical machines and communicating over a network. Attachment may be facilitated, for example, by code executed within the secure compute layer 7 of FIG. 1. For example, where a virtualized block storage device 24 is used, the secure compute layer 7 may be configured to directly pass block operations obtained at the block storage device 24 to the block storage services 105 for implementation, such that it appears from the point of view of an instance 116 that volumes 106 represent local storage drives. Additionally or alternatively, embodiments of the present disclosure can enable an instance 116 to interact with the block storage service 105 via file operations. For example, the secure compute layer 7 may execute code to obtain file operations from an instance 10 (e.g., submitted to a virtualized file system device 32), translate the file operations to block operations, and pass those block operations to the block storage services 105 for implementation. In some cases, translation of file operations to block operations may occur directly within the secure compute layer 7 based on data stored within that layer 7. In other cases, translation of file operations to block operations may occur externally to the layer 7. For example, the secure compute layer 7 may pass file operations for an instance 10 to a network service configured to convert between file operations and block operations.

The object storage servers 110 represent a distinct type of storage within the cloud provider network 120. The object storage servers 110 and associated control plane functionality can provide an object-based storage service of the cloud provider network. Object-based storage services can be referred to as a blob storage service, cloud object storage service, or cloud storage service, in various implementations. In contrast to block-based storage (e.g., where devices read and write fixed-length blocks identified by a location, such as a logical block address (LBA)), object storage services 110 facilitate storage of variable-length objects associated with a corresponding object identifier. Each object may represent, for example, a file submitted to the servers 110 by a user for storage (though the servers 110 may or may not store an object as a file). In contrast to block-based storage, where input/output (I/O) operations typically occur via a mass storage protocol like SATA (though potentially encapsulated over a network), interactions with the object storage servers 110 may occur via a more general network protocol. For example, the servers 110 may facilitate interaction via a Representational State Transfer (REST) application programming interface (API) implemented over the Hypertext Transport Protocol (HTTP). The object storage servers 110 may store objects within resources referred to as buckets 111. Each object typically includes the data being stored, a variable amount of metadata that enables various capabilities for the object storage servers 110 with respect to analyzing a stored object, and a globally unique identifier or key that can be used to retrieve the object. Objects stored on the object storage servers 110 are associated with a unique identifier, such that authorized access to them can be obtained through requests from networked computing devices in any location. Each bucket 111 is associated with a given user account. Users can store as many objects as desired within their buckets, can write, read, and delete objects in their buckets, and can control access to their buckets and the objects contained therein. Further, in embodiments having a number of different object storage servers 110 distributed across different ones of the regions described above, users can choose the region (or regions) where a bucket is stored, for example to optimize for latency. Users can use object storage servers 110 for purposes such as storing photos on social media websites, songs on music streaming websites, or files in online collaboration services, to name a few examples. Applications developed in the cloud often take advantage of the vast scalability and metadata characteristics of the object storage servers 110. The object storage servers 110 can support highly parallel data accesses and transfers. The object storage servers 110 can offer even greater redundancy than the block store servers 105, as the object storage servers 110 can automatically replicate data into multiple availability zones. The object storage servers 110 also have different data throughput than the block store servers 105, for example around 20 Mbps for a single stream of data.

Similarly to block store servers 105, embodiments of the present disclosure can enable an instance 116 to interact with object storage servers 110 "natively," by use of file operations built-in to an operating system. For example, a secure compute layer 7 may obtain a file operation at a virtualized file system device 32, translate the file operation to an operation on object store services 110 (e.g., using data maintained at the layer 7 or via interaction with a network service, such as a server to map file names on an instance 116 to objects on an object storage server 110), and implement the operations on the object storage services 110. Thus, while block store servers 105 and object storage servers 110 represent different types of cloud storage services, these services may be made to appear effectively identical from the point of view of an instance 116 when implemented as virtualized file system devices 32.

As illustrated in FIG. 2, the cloud provider network 120 can communicate over network 104 with client computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. Client computing devices 102 can include any network-equipped computing device, for example desktop computers, laptops, smartphones, tablets, e-readers, gaming consoles, and the like. Clients can access the cloud provider network 120 via the network 104 to view or manage their data and computing resources, as well as to use websites and/or applications hosted by the cloud provider network 120. While shown as distinct in FIG. 2, elements of the cloud provider network 120 may also act as clients to other elements of that network 120. Thus, a client device 102 can generally refer to any device accessing a network-accessible service as a client of that service.

Figure 3:
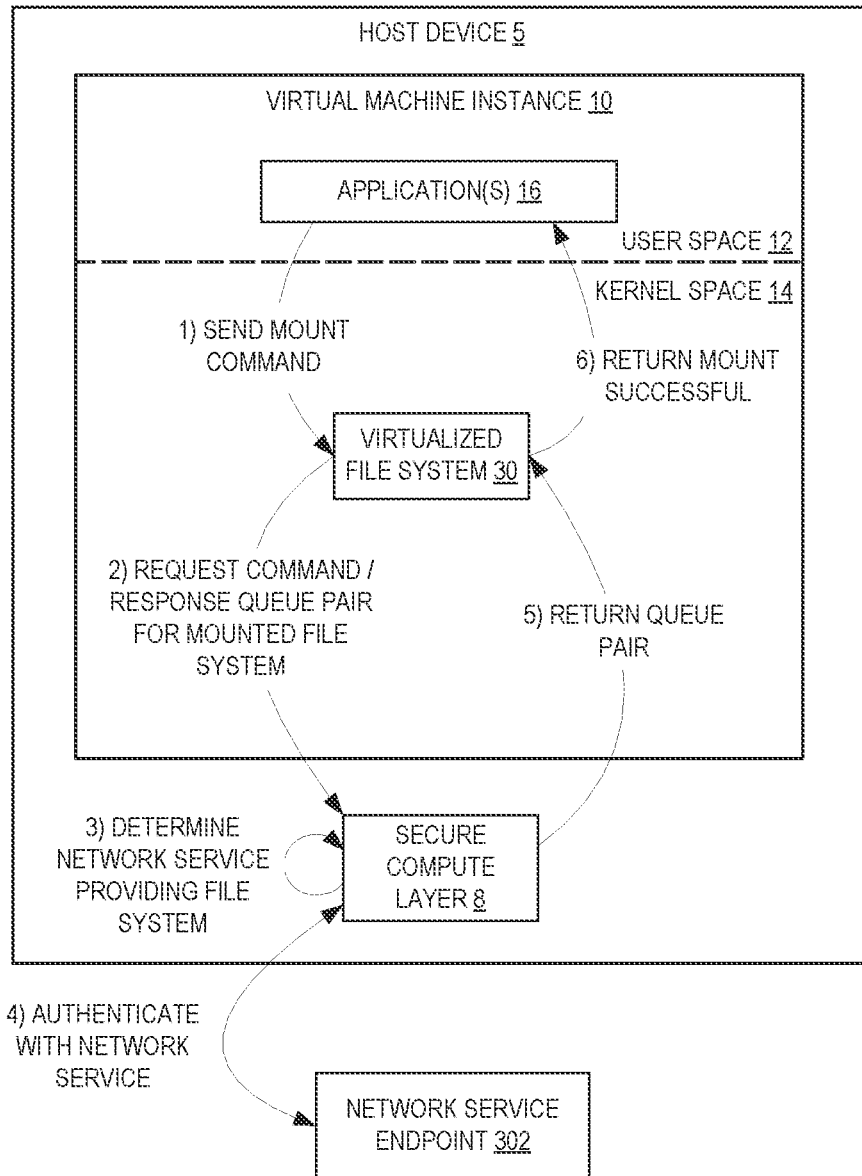
FIG. 3 depicts illustrative interactions on the host device of FIG. 1 to mount a virtualized file system provided by a virtualized file system device and enabling interaction with a network-accessible storage service in a manner similar to a local file system.

With reference to FIG. 3, illustrative interactions will be described for utilizing a virtualized file system device 32 to access a network-accessible storage service on a virtual machine instance 10. Specifically, FIG. 3 depicts operations to "mount" a virtualized file system 30 provided by a virtualized file system device 32, thus enabling interaction with the virtualized file system 30 in a manner similar to other local file systems (e.g., without requiring the instance 10 to handle network transmissions).

The interactions of FIG. 3 begin at (1), where an application 16 transmits to the virtualized file system 30 a "mount" command indicating that the virtualized file system device 32 is to be mounted as a file system. The command may illustratively identify a "mount point" for the file system 30 (e.g., "/mnt/myfs") the virtualized file system device 32 by reference to the file representing the virtualized file system device 32 within the operating system (e.g., "/dev/virtualized_file_system_device"). The command may further identify a format for the virtualized file system device 32, which corresponds to the virtualized file system 30. While the command is shown in FIG. 3 as issued directly to the virtualized file system 30, the command may in practice be routed to the virtualized file system 30 by other operating system components. For example, the command may traverse the system call interface 18 to the VFS 20, which may identify code of the virtualized file system 30 appropriate to handle the mount command based on the format of the virtualized file system 30 being identified within the call.

At (2), the virtualized file system 30 (e.g., via execution of code of the virtualized file system 30 implementing the mount command) transmits a request to the secure compute layer 8 for a command/response queue pair for the mounted file system. As discussed above, the secure compute layer may be represented in the instance 10 as the virtualized file system device 32, and thus the virtualized file system 30 may transmit the request by writing to the file representation of the virtualized file system device 32 (e.g., "/dev/virtualized_file_system_device").

At (3), the secure compute layer 8 determines a network service providing a file system. For example, a configuration of the instance 10 may link a particular virtualized file system device 32 to a particular network storage service, such as cloud-based block service, a distributed network file system (e.g., operating according to various distributed file system protocols, such as the network file system or "NFS" protocol, the LUSTRE™ protocol, etc.), or other network file system.

Accordingly, the secure compute layer 8 may, at (4), authenticate with the network service via a network service endpoint 302. In some embodiments, authentication may occur independent of information transmitted form the instance 10. For example, the secure compute layer 8 may obtain a token from the host device 5 indicating an account corresponding to the instance 10, which is provided to the instance 10 as part of deployment of the instance 10 within a cloud provider network 120. The secure compute layer 8 may then utilize this token to authenticate with the network service (which may also be provided by the cloud provider network 120 in some embodiments), such that software executing within the instance 10 need not provide authentication information. In other embodiments, the secure compute layer 8 may additionally or alternatively use information provided by software executing within the instance 10, such as a username and password or other authentication information supplied within the mount command. In some instances, the secure compute layer 8 may maintain a long-lived authenticated connection to the network service endpoint 302, such that future input/output (I/O) operations can be communicated via the long-lived authenticated connection, without requiring re-authentication of the secure compute layer 8.

Thereafter, at (5), the secure compute layer 8 returns to the virtualized file system 30 a command/response queue pair. For example, the secure compute layer 8 may return memory pointers indicating points within memory accessible to the instance 10 that correspond to each queue of the queue pair, may generate files on the instance 10 that may be written to and read from to enqueue items into or read from the respective queues, etc. Accordingly, future file operations to the virtualized file system 30 may be enqueued within the command queue, and responses to such operations may be read from the response queue, such that the applications 16 can conduct I/O on the virtualized file system 30. Moreover, because file operations can be passed directly to the secure compute layer 8 via the command queue, no loss in context or change in abstraction is required within the instance 10, and computation is beneficially offloaded to the secure compute layer 8. Accordingly, at (6), the virtualized file system 30 returns an indication to the application 16 that the mount command successfully executed.

While FIG. 3 depicts various example operations of the secure compute layer 8, additional operations are possible. For example, where there is a change in abstraction or format between file operations submitted by the instance 10 and those supported by a target network storage system, the secure compute layer 8 may be configured to maintain information facilitating translation between such file operations and operations supposed by the network storage system. Illustratively, where the network storage system is a cloud-based block storage system, the secure compute layer 8 similarly may be configured to translate file operations to corresponding calls supported by the block storage system. Such translation may entail, for example, maintaining information within the secure compute layer 8 translating file identifiers to corresponding blocks within a volume 106, in a similar manner that such information might otherwise be maintained within an instance 10, such as by the block storage file system 222. Accordingly, implementation of a mount command at the secure compute layer 8 may include, for example, loading such information as maintained at the layer 8, at a network-accessible storage location, etc.

Figure 4:
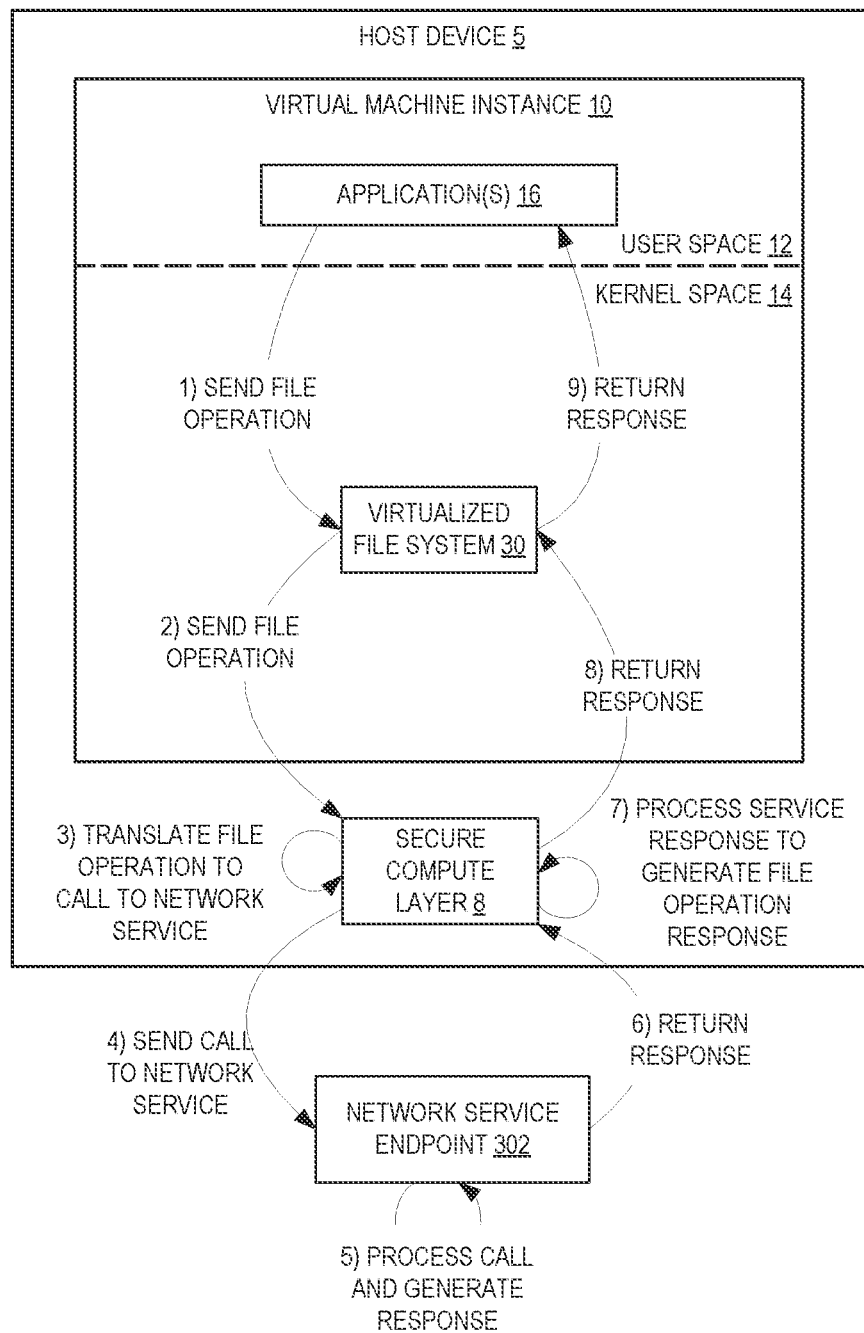
FIG. 4 depicts illustrative interactions on the host device of FIG. 1 to handle file operations to a virtualized file system in accordance with embodiments of the present disclosure.

With reference to FIG. 4, illustrative interactions will be described for handling file operations to a virtualized file system 30 in accordance with embodiments of the present disclosure. The interactions may occur, for example, subsequent to the interactions of FIG. 3.

At (1), an application 16 submits a file operation to the virtualized file system 30. The file operation may correspond to any of a wide variety of file operations supported by an operating system of the instance 10. By way of example only, such file operations may include "open," "close," "read," "write," "delete," "modify permissions" (e.g., "chmod"), "make directory" (e.g., "mkdir"), "create", "make symbolic link" (e.g., "symlink"), and "rename" operations. The file operation may illustratively be routed to the virtualized file system 30 by the VFS 20. For example, the file operation may specify a target file within a mount point of the virtualized file system 30, and thus the VFS 20 may route the file operation to the virtualized file system 30 (e.g., by invoking code of the virtualized file system 30 corresponding to the operation).

At (2), the virtualized file system 30 transmits the file operation to the secure compute layer 8, such as by enqueuing the operation onto a command queue of the virtualized file system 30, which as noted above may be represented within the instances as a virtualized file system device 32.

Thereafter, at (3), the secure compute layer 8 translates the file operation to a call to a network service corresponding to the virtualized file system 30. As noted above, the particular network service corresponding to the virtualized file system 30 may be set, for example, in a configuration of the instance 10. Accordingly, the secure compute layer 8 may identify the service based on that configuration. In addition, the secure compute layer 8 can translate the file operation to a corresponding call to the network service. For example, where the network service is a cloud-based block storage service, the secure compute layer 8 may determine one or more block operations to be implemented to satisfy the file operation (in a similar manner to how a block storage file system 22 may translate file operations to block operations when executed within an instance 10). As another example, where the network storage system is an object storage system (e.g., a bucket 111), the secure compute layer 8 may be configured to translate file operations to corresponding application programming interface (API) calls supported by the object storage system. For example, such an object storage system may in some cases not support directories, but rather allow for delimited file names to support pseudo-directories. In such a case, the secure compute layer 8 may, for example, translate directory operations (e.g., copy a directory, delete a directory, rename a directory, etc.) into corresponding file operations for each file within the directory. In the case where the network storage system is an NFS-compatible storage system, the secure compute layer 8 may generate an NFS transmission to the storage system, in a manner similar to how a network file system 26 may translate file operations to NFS protocol network packets when executed within an instance 10.

After translation, the secure compute layer 8 transmits the call to an endpoint 302 of the network service at (4). The network service endpoint 302, in turn, processes the call to generate a response at (5). The particular processing may vary according to the particular network service, and thus is not discussed in detail herein. However, processing may generally involve reading or writing to storage of the network accessible service in order to support the corresponding file operation.

At (6), the endpoint 302 returns the response to the secure compute layer 8. In some instances, the response from the network service endpoint 302 may be sufficient to generate a corresponding response to the virtualized file system 30. Accordingly, at (8), the secure compute layer 8 may process the service's response to generate a file operation response, such as by decapsulating data from network packets of the response, altering a format of the data according to the respective protocols of the responses, and the like.

In other instances, the response may be insufficient to generate a corresponding response. For example, where the network service corresponds to a cloud-based block storage system, multiple block-level operations may be required to satisfy a file operation. Accordingly, the secure compute layer 8 may process the response, determine a subsequent block operation that is required, and submit that block operation to the network service endpoint 302 in a subsequent call. Interactions (4)-(6) may thus be repeated any number of times to generate sufficient information to generate a file operation response to the virtualized file system 30.

In some instances, the interactions of FIG. 4 may be modified further. For example, in some cases the response from the network service endpoint 302 may indicate that requested information can be located at a given network location, and instruct the secure compute layer 8 to retrieve the requested information from the network location. Illustratively, where the network service endpoint 302 corresponds to a distributed file system, the initial call from the secure compute layer 8 may serve to identify a particular computing node within a network that contains the requested file. Rather than the endpoint 302 retrieving the file and returning it to the secure compute layer 8, the endpoint 302 may instruct the layer 8 to retrieve the file from the computing node. In some embodiments, the relative distribution of operations conducted by the secure compute layer 8 and the network service endpoint 302 may vary based on load between the layer 8 and the endpoint 302. For example, the layer 8 may implement certain operations when under light load, and offload those operations to the endpoint 302 when under heavier load (or vice versa). Thus, the layer 8 and the endpoint 302 may effectively form a distributed computing system that can interact in multiple ways to satisfy a file operation, with the secure compute layer 8 implementing a wide variety of operations to facilitate interaction between applications 16 and network storage systems. As discussed above, because these operations occur externally to the instance 10, these operations may be under control of an operator of the host device 5, which may be the same operator as the network storage system. As such, contrary to other approaches, these operations may be upgraded, changed, fixed, etc., without inhibiting privacy or security of the instance 10. Moreover, these operations can occur an environment trusted by that operator, reducing security concerns when implemented complicated logic.

On receiving sufficient information to generate a file operation response, the secure compute layer 8 generates that response at (7), and returns it to the virtualized file system 30 at (8). Illustratively, the layer 8 may write the response to a response queue accessible to the virtualized file system 30, which the virtualized file system 30 may monitor to detect the response. On obtaining the response, the virtualized file system 30 returns the response to the application 16 at (9), thus completing the file operation. Accordingly, from the point of view of the application 16, file operations occur as they might with any other file system. Moreover, processing within the instance 10 required to implement file operations is substantially reduced relative to other mechanisms.

With FIG. 4 is described with reference to operations on a virtualized file system 30, similar interactions may be used to support interactions with a wide variety of network services. For example, a virtualized service device 36 may be provided that is linked (e.g., via a configuration of the instance 10) to a particular network service, and that when initialized by the instance 10 provides a command/response queue similar to that discussed above. Applications 16 may submit commands (e.g., file operations or other commands) to the command queue. The secure compute layer 8, in turn, may translate such commands into corresponding calls to the network service, interact with the network service to generate a response, and enqueue that response within the response queue, where they may be read by the application 16. Thus, any variety of network interactions may be effectively offloaded to the secure compute layer 8, such that the instance 10 need not implement code to directly interact with the network service.

Figure 5:
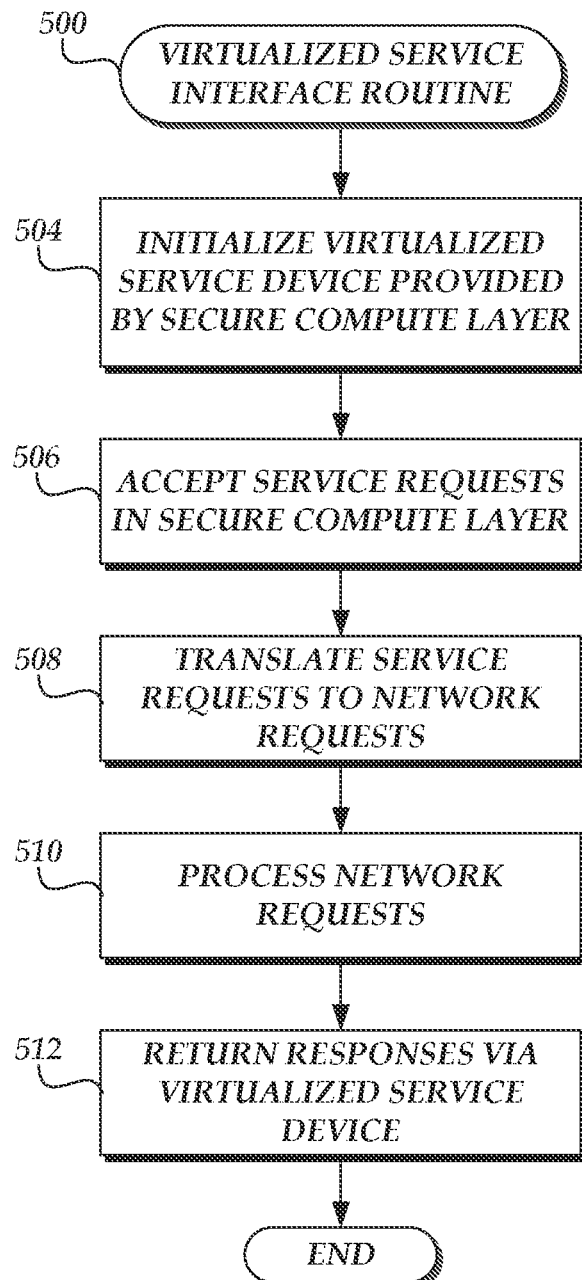
FIG. 5 depicts an illustrative routine for use of a virtualized service device corresponding to a secure compute layer to provide an interface facilitating interactions between an instance and a network service.

With reference to FIG. 5, an illustrative routine 500 will be described for use of a virtualized service device corresponding to a secure compute layer to provide an interface facilitating interactions between an instance (such as a bare metal instance or virtual machine instance) and a network service. The routine 500 may be implemented, for example, by the secure compute layer 8.

The routine 500 begins at block 504, where the secure compute layer 8 initializes a virtualized service device. Initialization may occur, for example, on startup of an instance. In other instances, initialization may occur based on a command received from the instance. For example, a "mount" command may cause the secure compute layer 8 to initialize the virtualized service device. As discussed above, initialization may include creation of a command/response queue pair enabling software of the instance to submit commands to the network service and obtain responses. In some cases, initialization may further include establishment of a connection to the network service, which connection may later be used to submit calls to the service corresponding to commands within the command queue and to receive corresponding network service responses.

At block 506, the secure compute layer 8 accepts services requests from the instance via the virtualized service device. For example, the request may be a request to read from or write to the virtualized service device, which as noted above may be represented as a file within the operating system of the instance. Thus, service requests may be represented as file operations within the operating system of the instance, and accordingly utilized standardized file operations natively supported by that operating system. Illustratively, a driver of the virtualized service device may route requests to write to the device to a command queue associated with the device and route requests to read from the device to a response queue associated with the device. In some instances, a virtualized service device may be associated with multiple such queues. For example, each write or read may specify a particular queue to which to write or read from. In other instances, the secure compute layer 8 may be associated with multiple virtualized service devices on the instance, and thus different queues may be distinguished on the basis of the device to which an input/output operation is requested. In one example, a virtualized service device may be mounted as a virtualized file system, and the service request may be a file operation directed to a file system object (e.g., a file, directory, hard link, symlink, etc.) within that virtualized file system. Illustratively, a "thin filesystem" loaded into the instance may route such file operations to the virtualized service device without a change in abstraction to the file operation. For example, the virtualized service device may be mounted as "/mnt/myfs", and a request to read "/mnt/myfs/myfile" may be routed to the virtualized file system as a request to read the file "mnt/myfs/myfile" (as opposed, for example, to being translated into block operations by the file system). Accordingly, the secure compute layer 8 is enabled to accept file operations directly from applications executing on an instance.

At block 508, the secure compute layer 8 translates file operations into corresponding network requests (or network "calls") to a network-accessible service. In one embodiment, the particular service may be established within a configuration of the instance, and thus may be determined independent of the service request. For example, a particular virtualized service device may be tied to a particular network-accessible storage service (and potentially to a particular location, account, bucket, etc. on the service), and thus the layer 8 may programmatically determine that any I/O requests directed to that device are to be routed to that service. In another embodiment, the particular service may be determined based on content of the request. For example, an I/O request may specify a particular service (or account, location, bucket, etc. on a service) to which the request is directed.

In general, translation of a request may include reformatting the request from a local file operation (e.g., an operation directed to the virtualized service device, as locally accessible to the instance) to a network operation. Thus, translation may include encapsulating the request in one or more network packets. In some instances, translation may further include altering a content or format of the request according to a required format of the target network-accessible service. For example, the secure compute layer 8 may maintain information mapping particular file operations (e.g., "open", "read", "write", "read directory," "link," "unlink," etc.) to corresponding API calls. In some instances, translation may entail creation of multiple network calls for a single file operation. For example, where a target storage system does not natively support directories but instead provides for pseudo-directories on the basis of object name prefixes, a single operation to modify a directory may be translated to multiple operations to modify files "stored in" that directory (e.g., having a prefix on the target storage system that corresponds to a name of the directory). In other instances, multiple file operations may be translated to a single network call. For example, the secure compute layer 8 may determine that multiple pending file operations may be combined into a single call to the network-accessible service.

In some instances, translation may include including within the service call one or more items of information not specified by the file operation. For example, a secure compute layer 8 may, by virtue of operating outside of the "boundary" of the instance, have access to authentication information for the instance. Illustratively, the secure compute layer 8 may be provided by a host computing device with a security token authenticating an account under which the instance was launched. The layer 8 may in some instances include such authentication information within the network calls. In this manner, software executing within the instance may be enabled to operate without specification of authentication information. Thus, functions that would otherwise be implemented internally on the instance are effectively offloaded to the secure compute layer 8.

At block 510, the secure compute layer 8 processes the network requests. In one embodiment, processing network requests may include sending a call to the network service, obtaining a response, and translating the response to a corresponding response (in a similar and inverted manner to translation of a service request to a corresponding call, as discussed above). The secure compute layer 8 may then return the translated response to the instance via the virtualized service device, at block 512. For example, in the case of a request to read a file, a network-accessible storage service may return data of the file, which the secure compute layer 8 may in turn return to the instance (e.g., by storing the data within memory accessible to the instance and enqueuing within a response queue a location of the data in the memory).

In other embodiments, the secure compute layer 8 may implement additional processing at block 510. For example, rather than directly providing data of a file, a response may return a network location at which the data is available. The secure compute layer 8 may thus obtain the data from the network location prior to returning a response at block 512. In still another example, a response may provide instructions to the secure compute layer 8 to implement additional processing (where such instructions may take the form of specifying pre-existing code to implement on the secure compute layer 8, the form of code provided within the response to be executed by the secure compute layer 8, etc.). The secure compute layer 8 may thus implement those instructions during block 510. As an example, where the secure compute layer 8 and the network-accessible service are operated by a single entity, the layer 8 and service may operate as a distributed system, with each enabled to offload processing to the other based, for example, on respective load on the devices, on required response time (accounting for an expected latency of processing at each of the devices), etc. Thus, the secure compute layer 8 is enabled to provide a wide variety of operations to implement network-accessible services.

The routine 500 then ends at block 512. As will be appreciated by one skilled in the art, the routine 500 thus enables software within an instance to interact with network-accessible services as a locally addressable device, simplifying execution of software within the instance. Moreover, because operations such as network communications occur externally to the instance, these operations may be altered without inhibiting security and privacy of the instance and may further be executed within a trusted environment (and therefore, e.g., bypass security checks associated with untrusted entities). Still further, because file operations can be provided directly to the secure compute layer 8 without a change in abstract or loss in context, the layer 8 is enabled to interact with a wide variety of network services. For example, the layer 8 is not bound to a particular type of service (e.g., block storage) due to a loss in context occurring within the instance (e.g., via operation of a file system to translate file operations to block operations). Implementation of the routine 500 therefore provides a number of advantages over alternative techniques.

The ability to implement functionality externally to an instance, and as an intermediary between the instance and network-accessible services, provides a platform on which to implement a variety of other beneficial techniques. For example, some embodiments of the present disclosure may be used to provide multi-service file systems, in which data within a file system is in fact stored within multiple network-accessible data storage services. Because these file systems may be seemingly local, from the point of view of an instance, the are sometimes referred to herein as "pseudo-local" file systems. In some instances, data within a multi-service file system may be partitioned between different network storage services. For example, data within a first directory may be stored within a first network storage service, data within a second directory may be stored within a second network storage service, etc. In other instances, data within a multi-service file system may be duplicated among storage services. For example, data may be stored in multiple network storage services for resiliency or redundancy. Illustratively, a secure compute layer may maintain (or obtain from an external device) mapping data that maps particular files to particular network-accessible services (and, e.g., locations thereon). The secure compute layer may thus handle file operations by determining, from the mapping, which service (and potentially which location on such a service) should be used to service the file operation. Furthermore, a secure compute layer as disclosed herein may implement logic to select a particular storage service in which to store a file based on various user-specified criteria (e.g., as conditional mappings or the like). For example, a user may specify a variety of rules each including criteria, and a secure compute layer may analyze file operations to determine whether a particular file meets criteria in a given rule. If so, the layer may handle the operation according to the rule. Illustratively, writes of data over a certain size may be routed to a first storage service, while writes of data under the size may be routed to a second storage service. In this way, a secure compute layer may operate as a file operation "router", routing file operations to a variety of network services according to the file operation, the file being operated on, etc.

Moreover, the secure compute layer may implement a variety of desirable functionalities externally to the instance, and thus not subject to (for example) corruption based on user-defined software executing within the instance. Illustratively, functionalities such as file archiving and backup may be implemented via policies on the secure compute layer, thus removing a need to provide software implementing these functionalities within the instance 10. As another example, the secure compute layer may implement operations such as failovers in cases of service inaccessibility. Illustratively, the secure compute layer may attempt to read a file from a first storage service, and if that attempt fails, instead read the file from a second storage service. In some cases, multiple services may be combined according to the characteristics of each service. For example, where a first network storage service has high throughput but also high latency and a second network service has low throughput but low latency, the secure compute layer may "stage" writes to the second network service (enabling such writes to rapidly succeed) before later committing the writes to the first network service (e.g., for long term storage). Similarly, in such a configuration, the secure compute layer may utilize one network storage service as a "cache" to store data retrieved from a second network storage service, such as by storing read data to the first network service and using that copy of the data to satisfy subsequent read requests. Accordingly, any of a variety of beneficial functionalities may be implemented by embodiments of the present disclosure.

Figure 6:
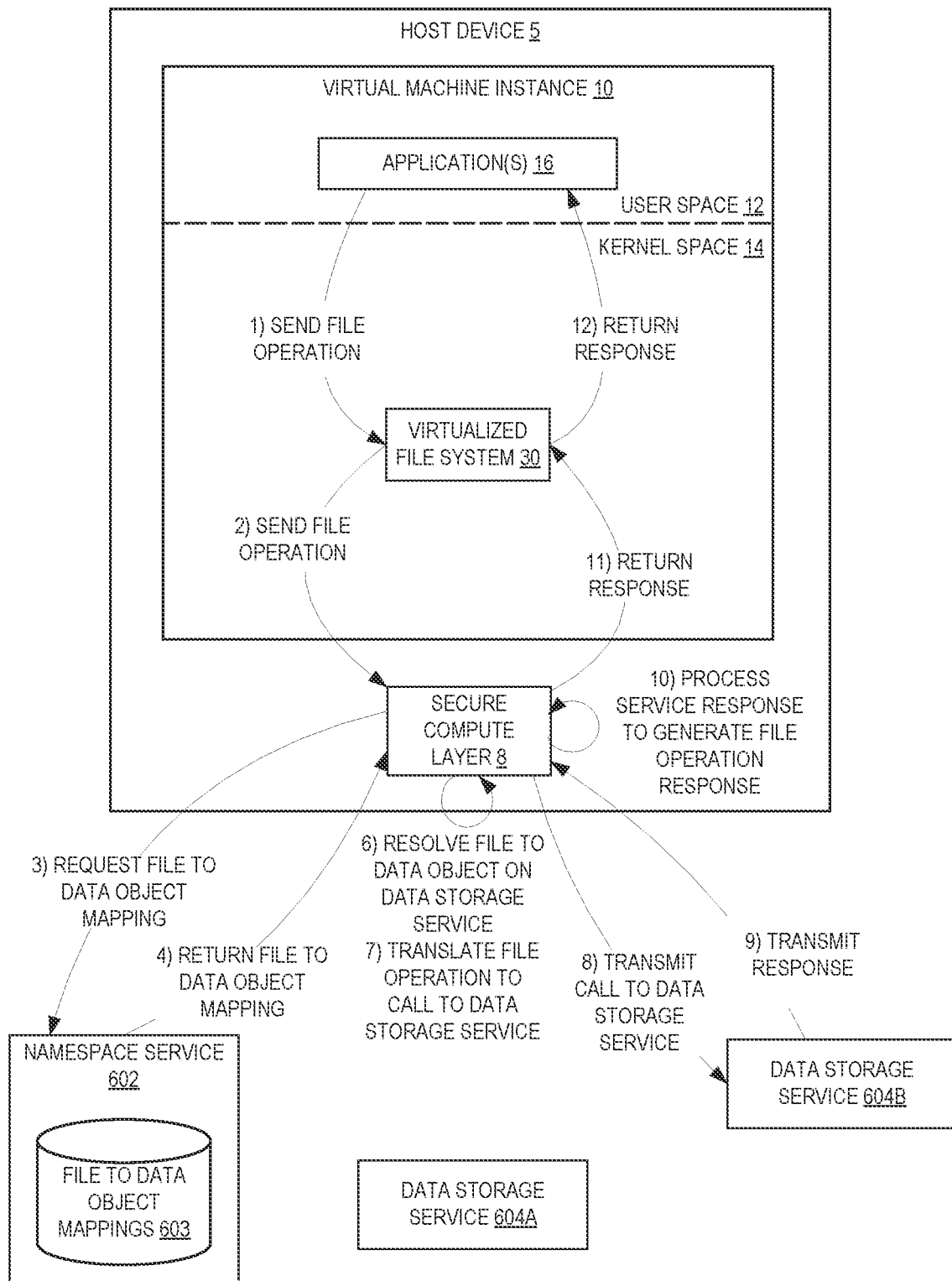
FIG. 6 depicts illustrative interactions on the host device of FIG. 1 to provide pseudo-local, multi-service file system on an instance by use of a secure compute layer.

With reference to FIG. 6, illustratively interactions will be described for implementing a multi-service file system on an instance 10 by use of a secure compute layer 8, in accordance with embodiments of the present disclosure. The interactions, from the point of view of the instance 10, appear similar to those described above with reference to FIG. 4. That is, an application 16 may submit a file operation to the virtualized file system 30, which in turn sends the file operation to the secure compute layer 8. The layer 8 provides a response to the virtualized file system 30, which is passed to the application 16. Accordingly, interactions (1)-(2) and (11)-(12) are not described in detail herein, and are similar to corresponding interactions of FIG. 4.

The interactions depicted in FIG. 6 differ from those of FIG. 4 in the operations of the secure compute layer 8. More specifically, the interactions of FIG. 6 depict specific operations of the secure compute layer 8 to implement a multi-service file system. As noted above, a multi-service file system may be associated with mapping data that maps files (or other file system objects, such as directories) to corresponding network-accessible services. For example, a file system may be illustratively be represented as a hierarchical tree data structure, and mapping data may associate nodes or branches of that tree to a particular network storage service or a particular location on such a network storage service, or may specify rules for handling file operations to such nodes or branches (which rules may in turn resolve to a particular service or location, according to criteria set forth within the rules).

In one embodiment, the mapping data is stored within a file to data object mappings data store 603 of a namespace service 602, which illustratively represents a network-accessible service for managing such mapping data. For example, the namespace service 602 may provide end users the ability to access mapping data and modify that data (e.g., by specifying new mappings, new rules for conditional mappings, etc.). Accordingly, on receiving a file operation, the secure compute layer 8, at (3), requests the file to data object mapping for the instance 10. The namespace service 602, at (4), returns the file to data object mappings at (4).

While FIG. 6 depicts retrieval of mapping data responsive to a file operation, other configurations are possible. For example, the secure compute layer 8 may locally store and manage mapping data, as opposed to use of a namespace service 602. As another example, prior to an individual file operation, the secure compute layer 8 may retrieve the mapping data from the namespace service 602 and cache the mapping data locally, thus enabling the secure compute layer to service individual file operations without further interaction to the namespace service 602.

After obtaining the file to data object mapping data, the secure compute layer 8, at (6), resolves the file that is subject to the file operation into a data object on a data storage service. As noted above, a multi-service file system may utilize multiple network services to provide a file system. For example, the instance 10 may store a first subset of files within the virtualized file system 30 on data storage service 604A and a second subset of files within the virtualized file system 30 on data storage service 604B. Additionally or alternatively, some files within the virtualized file system 30 may be stored on both data storage service 604A and data storage service 604B. While FIG. 6 depicts two data storage services, any number of such services may be used to provide a multi-service file system. Thus, an individual file may be stored in one or more of a number of possible network file systems.

Accordingly, by reference to mapping data, the secure compute layer 8 may determine which network-accessible service (or combination of such services) corresponds to a given file operation. Illustratively, where mapping data represents the file system as a tree hierarchy with individual nodes in the hierarchy (representing file system objects within the file system) being mapped to individual locations on one or more various network storage systems, the secure compute layer 8 may determine a nearest node to the file identified within the file operation, and determine which one or more storage systems are mapped to that node by the mapping data. As another illustration, where mapping data includes rules for determining network storage systems mapped to a file, the secure compute layer 8 may determine which rules are satisfied by the file operation in order to identify a corresponding network storage service for the file operation.

While FIG. 6 discusses resolving files, similar operations may occur with respect to other file systems objects, such as directories, symbolic or hard links, etc. Moreover, while FIG. 6 depicts a single resolution, in some cases file operations may operate with respect to two or more file system objects. For example, a "copy" operation may involve both a source file and a destination file. Accordingly, the secure compute layer may resolve each file within a file operation into a corresponding location on a network-accessible files system.

Subsequent to resolving the file operation into a corresponding network-accessible files system, the secure compute layer 8, at (7), translates the file operation into a call to that data storage service. For purposes of description, it is assumed in FIG. 6 that the particular file operation corresponds to an operation on a data object within data storage service 604B. Subsequently, the secure compute layer 8 transmits the call to the destination data storage service, data storage service 604B, at (8). The secure compute layer 8 then obtains a response at (9), processes the response to generate a file operation response at (10), and returns the response to the virtualized file system 30, and in turn to the application 16, at (11) and (12). Translation of a file operation to a network call, handling of that network call, and generation of a file operations response, are discussed in more detail with respect to FIG. 4 and thus these interactions are not described in detail herein.

While FIG. 6 depicts a limited set of network interactions, other interactions are possible. For example, as noted above a data storage service may in some cases return instructions to the secure compute layer 8 that may be implemented as part of interaction (10). In some cases, implementation of such instructions may include further network interactions, such as retrieving requested data from a network location identified within the instructions. Moreover, in some instances, file operations may be translated to multiple network calls, potentially to different network data storage services. As an example, a "copy" operation may specify both a source and destination file. In some instances, these files may correspond to data objects on different network-accessible storage services. Accordingly, implementation of the copy operation on the secure compute layer 8 may involve (in addition to resolving the respective files to locations on network-accessible storage services), reading a data object from a first storage service and writing the data object on a second storage service. In some instances, multiple network calls may occur serially. For example, in implementing a copy operation, the secure compute layer 8 may make a first call to read data and subsequently make a second call to a second service to write the data. In other instances, multiple network calls may occur at least partly concurrently. For example, where data is to be written to multiple services, the layer 8 may make calls to write the data concurrently. As discussed above, in some instances calls may be conditional. For example, a secure compute layer 8 may attempt to read or write data to one location, and failover the operation to a second location if the attempt fails. Thus, the specific interactions of FIG. 6 are illustrative in nature.

While FIG. 6 depicts interactions with network-accessible storage services, in some instances the host device 5 may also provide storage (e.g., as all or part of a solid-state drive or hard disk drive physically installed on the host device 5). In such instances, local storage of the host device 5 may be utilized in a similar manner to network accessible services. For example, specific files or directories within a multi-service file system may be stored within local storage of the device 5.

Figure 7:
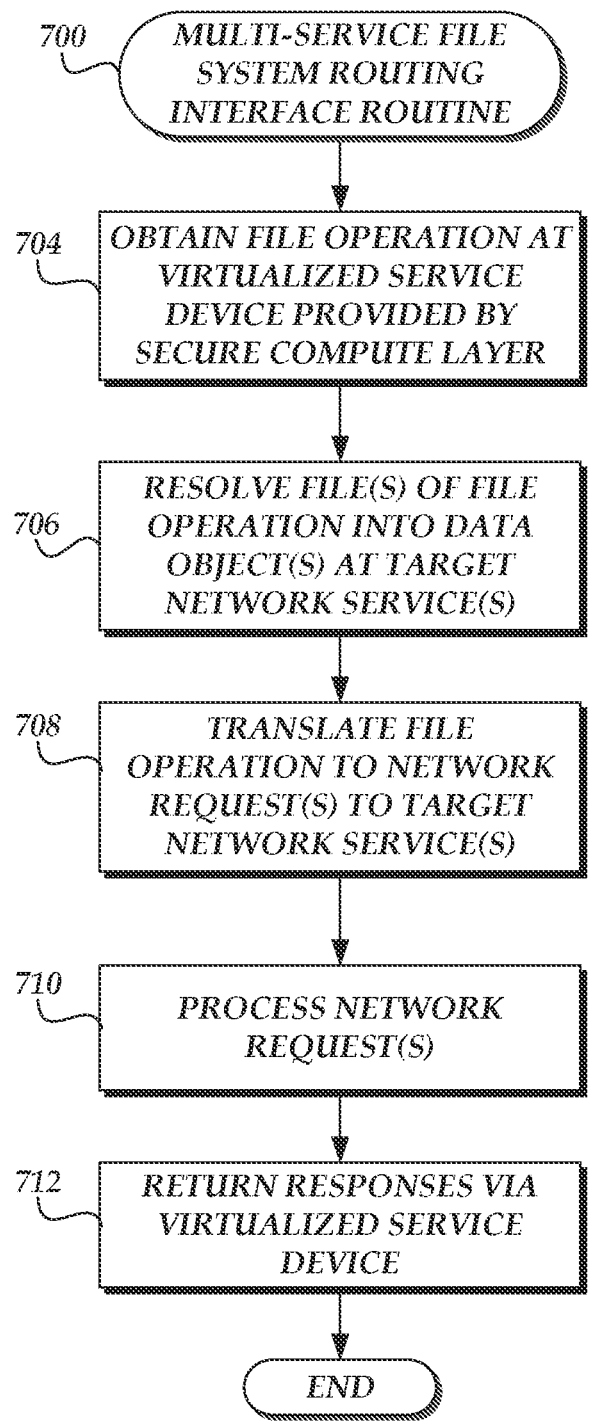
FIG. 7 depicts an illustrative routine for implementing a pseudo-local, multi-service file system routing interface.

With reference to FIG. 7, an illustrative routine 700 will be described for implementing a pseudo-local, multi-service file system routing interface. The routine 700 may be implemented, for example, by the secure compute layer 8 of FIG. 1. As discussed above, the routine 700 may provide for routing file operations by a client computing device (e.g., an instance 10) to a locally-addressable virtualized service device to multiple network-accessible storage services, thus enabling the multiple storage services to act as a multi-service file system that, from the point of view of the client device, is a local file system. Accordingly, the routine 700 may be utilized to combine a wide variety of network storage services, such as cloud-based block storage, object storage, databases, and the like, into a single, local file system.

The routine 700 begins at block 704, where the secure compute layer 8 obtains a file operation at a virtualized service device of a client computing device, the virtualized service device being provided by the secure compute layer 8. As discussed above, the virtualized service device may be represented as a virtualized device of the client computing device (e.g., as, from the point of view of the client computing device, a physical device installed into the client computing device). Illustratively, the client computing device may include a driver than facilitates transmission of file operations to the virtualized service device by writing from and reading to a command/response queue pair corresponding to a memory location accessible by the client computing device. As discussed above, the file operations may be from applications executing on the client computing device (e.g., in userspace), and may be passed to the secure compute layer 8 with little or no modification, no change in abstraction, and no loss in context. Illustratively, the file operations may be represented to the secure compute layer 8 as native operating-system-level file operations (e.g., open, read, write, etc.), as opposed for example to block-level operations.

At block 706, the secure compute layer 8 resolves one or more files identified in the file operation into one or more data objects on one or more target network services. Illustratively, for each file identified in the file operation, the secure compute layer 8 may inspect file to data object mapping data that maps the file to a data object on a network-accessible storage service. As an example, where the root of a file system is designated as "/", a first directory "/blockstore/" may be mapped to a block storage volume, a second directory "/objectstore/" may be mapped to an object storage location (e.g., a "bucket"), a third directory "/database/" may be mapped to a database, etc. (From the perspective of the client computing device, each directory may appear to represent the same file system, corresponding to the same virtualized file system device, e.g., "/dev/myfs".) Accordingly, the secure compute layer 8 may inspect the mapping to resolve a file in the file operation into a service. For example, a write to "/objecstore/object1" may be resolved into the object storage location corresponding to "/objectstore/" or, in some cases, into a particular object in that location. Similarly, a write to "/blockstore/file1" may be resolved into a volume on a block storage service or, in some cases, into particular blocks of that volume. In one embodiment, the secure compute layer 8 resolves each file into a corresponding network-accessible storage service, and resolution of files to particular data objects on the network-accessible storage service is handled by the respective storage system. For example, the secure compute layer 8 may remove a portion of a file path identified within the mapping, and submit a remainder of the file path to the network-accessible storage service for resolution into a data object (e.g., a call to read "/blockstore/file1" may be passed to a block storage system as a call to read "/file1"). In another embodiment, the secure compute layer 8 may include service-specific logic to resolve files into particular service-specific data representations. For example, the secure compute layer 8 may include code to resolve a particular file on a block storage volume into logical block addresses on that volume. As discussed above, resolution may occur for each file identified in a file operation. In one embodiment, resolution may occur based on data locally stored at the secure compute layer 8. In another embodiment, resolution may occur based on mapping data retrieved from a remote service, such as a namespace service.

At block 708, the secure compute layer 8 translates the file operation into one or more network requests to the target network services identified at block 706. Translation of file operations into network requests is discussed in more detail above. However, in brief, the secure compute layer 8 may determine one or more network call, such as API calls, for each service that facilitates handling of the file operation. For example, a request to read a file that is mapped to a data object at an object store service may be translated into a network call to the object storage service to read the file. As another example, a request to read a file that is mapped to a file on a block storage service may be translated into a network call to read one or more blocks of a block storage volume provided by the block storage service. Accordingly, by implementing the calls, the secure compute layer 8 may satisfy the file operation.

In some embodiments, a file operation may be mapped to multiple network calls. For example, a request to copy a file from a first location corresponding to a first network storage service to a second location corresponding to a second network service may be translated into calls to both network services. As another example, where a first service is used as a "staging" location for writes, a call to write a file may be translated into both an initial call to the first service, and a later call to "commit" the write to a second service. As yet another example, where a second service is used as a failover location for a first service, a call to read a file may be translated into a call to read data from a first service, and a conditional call to read the file from the second service in the case of failure of the first call. Accordingly, the secure compute layer 8 may implement a variety of beneficial functionalities to handle storage operations on behalf of a client computing device.

Thereafter, at block 510, the secure compute layer 8 processes the network requests, such as by transmitting the requests to the identified network services. As noted above, in some instances the secure compute layer 8 may implement additional functionality to process network requests. For example, the secure compute layer 8 may authenticate itself to the relevant services via authentication information associated with the client computing device. As another example, the secure compute layer 8 may process network requests by implementing instructions within responses to the network requests. For example, a network service may respond to a read request with a network location at which the requested data may be read. Accordingly, the secure compute layer 8 may retrieve the data from the network location as part of processing the network request.

After processing the network requests, the secure compute layer 8, at block 712, returns a response to the file operation to the client computing device. For example, in the case of a write request, the secure compute layer 8 may enqueue within a response queue of a virtualized service device an acknowledgement of the write request. In the case of a request to read a file, the secure compute layer 8 may return data of the file (as returned in a network response) to the instance, such as by storing the data within memory accessible to the instance and enqueuing within a response queue a location of the data in the memory. Thus, the file operation is processed. The routine 700 then ends.

While FIG. 7 discusses network requests, in some embodiments the secure compute layer 8 may additionally translate file operations into local operations. For example, the secure compute layer 8 may implement local storage, and a subset of files on a multi-service file system may be mapped to that local storage. As another example, the secure compute layer 8 may implement data caching, such that files mapped to a network storage service are cached at local storage of the secure compute layer 8, and such that at least some operations on cached files may be serviced without network operations. Illustratively, the secure compute layer 8 may implement caching such that files meeting given criteria (e.g., a threshold size, on a specific service, etc.) are cached within local storage, and subsequent read operations on the files are satisfied via cached copy of the file. Caching may also be used to service other operations, such as write operations, and the secure compute layer 8 may implement logic to later synchronize local modifications with remote storage. Accordingly, a multi-service file system may combine data of multiple network-accessible services with local storage of a computing device.

Figure 8:
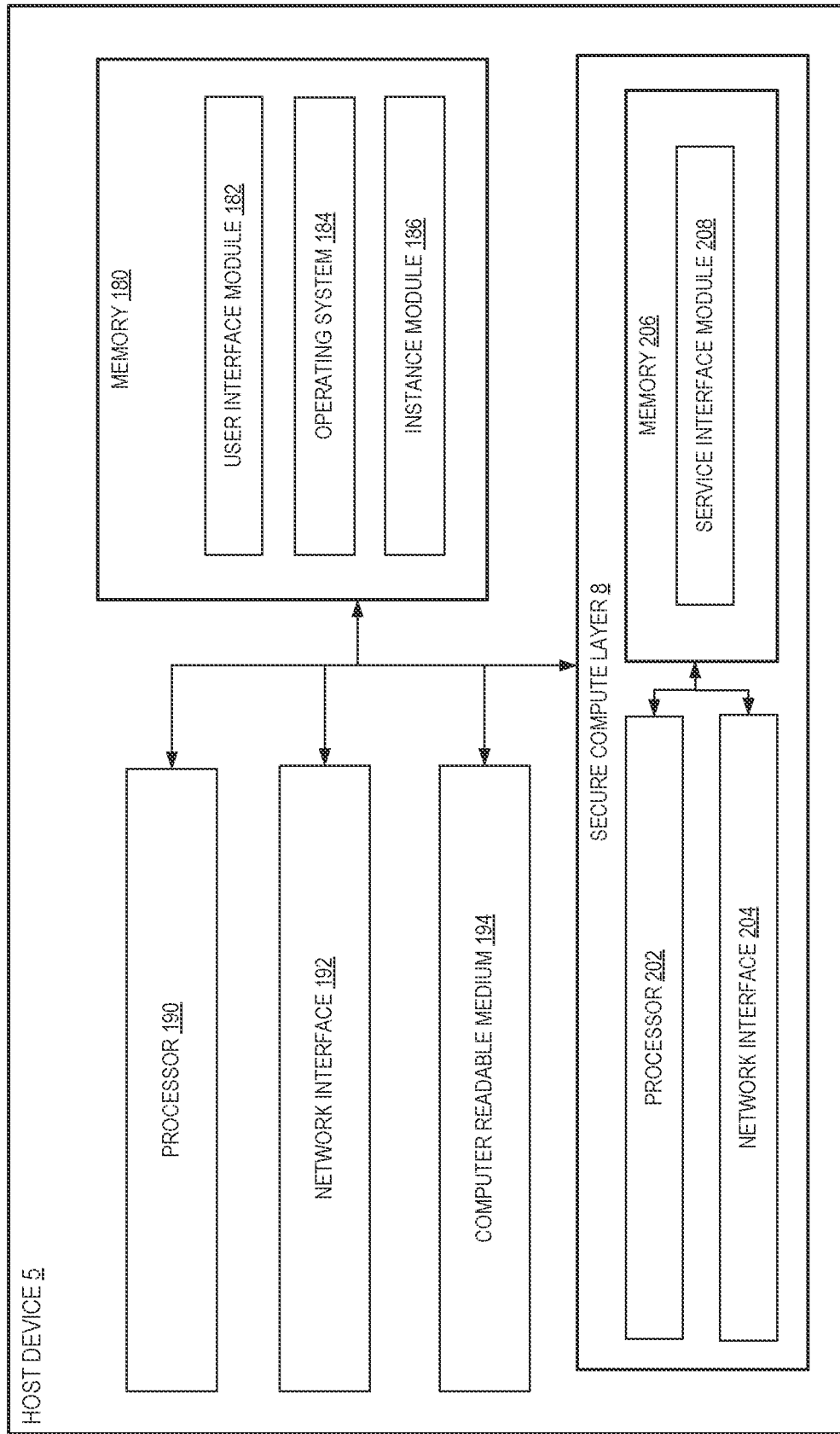
FIG. 8 depicts a general architecture of a computing device or system providing virtualized service devices in accordance with aspects of the present disclosure.

FIG. 8 depicts an example architecture of a computing system (referred to as the host device 5) that can be used to perform one or more of the techniques described herein or illustrated in FIGS. 1-7. The general architecture of the host device 5 depicted in FIG. 8 includes an arrangement of computer hardware and software modules that may be used to implement one or more aspects of the present disclosure. The host device 5 may include many more (or fewer) elements than those shown in FIG. 8. It is not necessary, however, that all of these elements be shown in order to provide an enabling disclosure. As illustrated, the host device 5 includes a processor 190, a network interface 192, and a computer readable medium 194, all of which may communicate with one another by way of a communication bus. The network interface 192 may provide connectivity to one or more networks or computing systems. The processor 190 may thus receive information and instructions from other computing systems or services via the network 104 illustrated in FIGS. 1 and 2.

The processor 190 may also communicate with memory 180. The memory 180 may contain computer program instructions (grouped as modules or units in some embodiments) that the processor 190 executes in order to implement one or more aspects of the present disclosure. The memory 180 may include random access memory (RAM), read only memory (ROM), and/or other persistent, auxiliary, or non-transitory computer-readable media. The memory 180 may store an operating system 184 that provides computer program instructions for use by the processor 190 in the general administration and operation of the host device 5. The memory 180 may further include computer program instructions and other information for implementing one or more aspects of the present disclosure. For example, in one embodiment, the memory 180 includes a user interface module 182 that generates user interfaces (and/or instructions therefor) for display upon a user computing device, e.g., via a navigation and/or browsing interface such as a browser or application installed on the user computing device. In addition to and/or in combination with the user interface module 182, the memory 180 may include an instance module represented code executable to host virtual machine instance, which may utilize components of the host device 5 (e.g., the processor 190, network interface 192, etc.) as virtualized hardware supporting execution of that instance.

As discussed above, such an instance (or other software executing within memory 180, particularly in the case of a "bare metal" instance) may thereafter interact with network-accessible services via interaction with the secure compute layer 8. As shown in FIG. 8, the secure compute layer 8 can include hardware isolated from other hardware of the host device 5. For example, the secure compute layer 8 may be implemented as an expansion card of the host device 5. The secure compute layer 8 can thus include a processor 202, network interface 204, and memory 206 that functions similarly to but is distinct from the respective processor 190, network interface 192, and memory 180 discussed above. The memory 206 illustratively includes a service interface module 208 executable to implement aspects of the present disclosure, e.g., accepting service requests to one or more virtualized service devices, translating such requests to network calls, obtaining results of such calls and returning the results as service request results to software of the instance via the one or more virtualized service devices.

While FIG. 8 is depicted as the host device 5, a similar device may be used to implement other elements of FIGS. 1-2. For example, a device having a similar configuration when programmed with appropriate modules may be used to implement compute servers 115, file system servers 105, or object storage servers 110.

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A processor device can be a microprocessor, but in the alternative, the processor device can be a controller, micro-controller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Various example embodiments relating to features described herein can be found in the following clauses:

Clause 1. A system for handling network file operations on a virtual machine instance via a locally-addressable offload card, the system comprising:
  one or more computing devices hosting a network-accessible storage system;
  a host computing device comprising:
    a first subset of hardware comprising a first processor and first memory, the first subset of hardware hosting a virtual machine instance comprising an operating system and one or more software application;
    a second subset of hardware comprising a second processor and second memory, the second subset of hardware hosting a secure compute layer, wherein the secure compute layer is locally addressable by the operating system of the virtual machine instance as a virtualized file system device;
  wherein the secure compute layer is configured to:
    obtain a command to mount the virtualized file system device as a virtualized file system;
    in response to the command to mount the virtualized file system device as a virtualized file system, establish a communication session with the network-accessible storage system;
    accept file operations from the one or more software applications addressed to the virtualized file system;
    translate the file operations from the one or more software applications addressed to the virtualized file system into corresponding calls to the network-accessible storage system;
submit the corresponding calls to the network-accessible storage system via the communication session;
obtain results from the corresponding calls; and
return the results of the corresponding calls to the network-accessible storage system to the one or more software applications as responses to the file operations from the virtualized file system device.

Clause 2. The system of Claim 1, wherein file operations are generated during execution of the one or more software application in user space of the operating system, and wherein the file operations are passed to the virtualized file system by a virtual file system (VFS) layer of the operating system.

Clause 3. The system of Claim 1, wherein the file operations are standard file operations specified by the operating system.

Clause 4. The system of Claim 1, wherein the network-accessible storage system is a cloud-based block storage system, and wherein translating the file operations from the one or more software applications addressed to the virtualized file system into corresponding calls to the network-accessible storage system comprises translating the file operations into block storage operations on the cloud-based block storage system.

Clause 5. A method implemented at a secure compute layer for a hosted computing instance, wherein the secure compute layer is locally addressable by an operating system of the hosted computing instance as a virtualized file system device of the hosted computing instance, and wherein the secure compute layer is implemented in memory that is inaccessible to the hosted computing instance, the method comprising:
obtaining a file operation from a software application of the hosted computing instance, the file operations addressed to the virtualized file system device of the hosted computing instance;
translating the file operation from the one or more software applications addressed to the virtualized file system device of the hosted computing instance into a call to a network-accessible storage system;
submitting the call to the network-accessible storage system via a network interface;
obtaining a result from the call; and
returning the result of the call to the network-accessible storage system to the software application as a response to the file operation from the virtualized file system device.

Clause 6. The method of Claim 5, wherein the hosted computing instance is hosted by a host computing device using a first processor and first memory of the host computing device, and wherein the secure compute layer is implemented by a second processor and a second memory of the host computing device.

Clause 7. The method of Claim 6, wherein the hosted computing instance is a virtual machine instance or a bare metal instance.

Clause 8. The method of Claim 5, wherein the hosted computing instance is a virtual machine instance, and wherein the secure compute layer is implemented by a hypervisor hosting the virtual machine instance.

Clause 9. The method of Claim 5, wherein the file operation is a request to read a file, and wherein obtaining the result from the call comprises:
obtaining, in response to the call, information identifying a network location storing data of the file; and
retrieving the data of the file from the network location as the result from the call.

Clause 10. The method of Claim 5, wherein obtaining the result from the call comprises:
obtaining, in response to the call, instructions to conduct specified processing to obtain the result; and
implementing the specified processing to obtain the result.

Clause 11. The method of Claim 5 further comprising obtaining a command to mount the virtualized file system device as a virtualized file system, wherein the file operation is addressed to a file system object within the virtualized file system.

Clause 12. The method of Claim 11 further comprising, in response to the command to mount the virtualized file system device as the virtualized file system, establishing a communication session with the network-accessible storage system.

Clause 13. The method of Claim 12, wherein the call is submitted via the communication session with the network-accessible storage system.

Clause 14. The method of Claim 12, wherein the hosted computing instance is authenticated to network-accessible storage system within the communication session based on information obtained at the secure compute layer independent of information obtained from the hosted compute instance.

Clause 15. One or more non-transitory computer-readable media comprising instructions implementable at a secure compute layer for a hosted computing instance, wherein the secure compute layer is locally addressable by an operating system of the hosted computing instance as a virtualized file system device of the hosted computing instance, wherein the secure compute layer is implemented in memory that is inaccessible to the hosted computing instance, wherein the instructions, when implemented by the secure compute layer, cause the secure compute layer to:
obtain a file operation from a software application of the hosted computing instance, the file operations addressed to the virtualized file system device of the hosted computing instance;
translate the file operation from the one or more software applications addressed to the virtualized file system device of the hosted computing instance into a call to a network-accessible storage system;
submit the call to the network-accessible storage system via a network interface;
obtain a result from the call; and
return the result of the call to the network-accessible storage system to the software application as a response to the file operation from the virtualized file system device.

Clause 16. The one or more non-transitory computer-readable media of Claim 15, wherein the instructions cause the secure compute layer to identify the network-accessible storage system from a configuration of the hosted computing instance.

Clause 17. The one or more non-transitory computer-readable media of Claim 15, wherein the hosted computing instance is authenticated to network-accessible storage system based on information obtained at the secure compute layer independent of information obtained from the hosted compute instance.

Clause 18. The one or more non-transitory computer-readable media of Claim 15, wherein the file operation is a request to read a file, and wherein obtaining the result from the call comprises:

obtaining, in response to the call, information identifying a network location storing data of the file; and
retrieving the data of the file from the network location as the result from the call.

Clause 19. The one or more non-transitory computer-readable media of Claim 15, wherein obtaining the result from the call comprises:
obtaining, in response to the call, instructions to conduct specified processing to obtain the result; and
implementing the specified processing to obtain the result.

Clause 20. The one or more non-transitory computer-readable media of Claim 15 further comprising obtaining a command to mount the virtualized file system device as a virtualized file system, wherein the file operation is addressed to a file system object within the virtualized file system.

Various additional example embodiments relating to features described herein can be found in the following clauses:

Clause 1. A system for providing a local file system corresponding to multiple network-accessible storage services via a locally-addressable offload card, the system comprising:
one or more computing devices hosting a plurality of network-accessible storage services;
a host computing device comprising:
a first subset of hardware comprising a first processor and first memory, the first subset of hardware hosting a virtual machine instance;
a second subset of hardware comprising a second processor and second memory, the second subset of hardware hosting a secure compute layer, wherein the secure compute layer is locally addressable by an operating system of the virtual machine instance as a virtualized file system device associated with a virtualized file system;
wherein the secure compute layer is configured to:
obtain mapping data mapping individual file system objects, within the virtualized file system, to one or more network-accessible storage services of the plurality of network-accessible storage services;
obtain file operations from the virtual machine instance;
for each file operation:
determine, from the mapping data, at least one network-accessible storage service of the plurality of network-accessible storage services that is mapped to a file system object identified within the file operation;
translate the file operation into one or more corresponding calls to the at least one network-accessible storage service determined from the mapping data;
submit the one or more corresponding calls to the at least one network-accessible storage service;
obtain a result from the one or more corresponding calls; and
return the result of the one or more corresponding calls to the virtual machine instance as a response to the file operation.

Clause 2. The system of Clause 1, the plurality of network-accessible storage services comprises one or more of a block storage system, an object storage system, or a database.

Clause 3. The system of Clause 1, wherein file operations are generated during execution of one or more software application in user space of an operating system of the virtual machine instance, and wherein the file operations are passed to the virtualized file system by a virtual file system (VFS) layer of the operating system.

Clause 4. The system of Clause 1, wherein the file operations are standard file operations specified by the operating system.

Clause 5. The system of Clause 1, wherein the mapping data further maps individual file system objects within the virtualized file system to local storage of host computing device.

Clause 6. A method implemented at a secure compute layer for a hosted computing instance, wherein the secure compute layer is locally addressable by an operating system of the hosted computing instance as a virtualized file system device of the hosted computing instance, wherein the virtualized file system device is associated with a virtualized file system, and wherein the secure compute layer is implemented in memory that is inaccessible to the hosted computing instance, the method comprising:
obtaining mapping data mapping individual file system objects, within the virtualized file system, to one or more network-accessible storage services of a plurality of network-accessible storage services;
obtaining a file operation from the hosted computing instance;
determining, from the mapping data, at least one network-accessible storage service of the plurality of network-accessible storage services that is mapped to a file system object identified within the file operation;
translating the file operation into one or more corresponding calls to at least one network-accessible storage service determined from the mapping data;
submitting the one or more corresponding calls to the at least one network-accessible storage service;
obtaining a result from the one or more corresponding calls; and
returning the result of the one or more corresponding calls to the hosted computing instance as a response to the file operation.

Clause 7. The method of Clause 6, wherein the file operation is a write operation, wherein the at least one network-accessible storage service comprises a first network-accessible storage service and a second network-accessible storage service, and wherein submitting the one or more corresponding calls for the file operation to the at least one network-accessible storage service comprises writing data to the first and second network-accessible storage services in parallel.

Clause 8. The method of Clause 6, wherein the file operation is a write operation, wherein the at least one network-accessible storage service comprises a first network-accessible storage service and a second network-accessible storage service, and wherein submitting the one or more corresponding calls to the at least one network-accessible storage service comprises initially staging written data to the first network-accessible storage service and subsequently committing the data to the second network-accessible storage service.

Clause 9. The method of Clause 6, wherein the at least one network-accessible storage service comprises a first network-accessible storage service and a second network-accessible storage service, and wherein submitting the one or more corresponding calls to the at least one network-accessible storage service comprises:
submitting a first call to the first network-accessible storage service;
determining that the first call has failed; and responsive to failure of the first call, submitting a second call to the second network-accessible storage service.

Clause 10. The method of Clause 6, wherein the file operation is a read operation, wherein the result from the one or more corresponding calls is data of a file being read in the read operation, and wherein the method further comprises:
- caching the data of the file in local storage of the secure compute layer as a cached copy;
- obtaining from the hosted computing instance a subsequent read operation for the file; and
- returning a result to the subsequent read operation based on the cached copy.

Clause 11. The method of Clause 6, wherein obtaining mapping data comprises obtaining the mapping data from a network-accessible namespace service.

Clause 12. The method of Clause 6, wherein the hosted computing instance is a virtual machine instance, and wherein the secure compute layer is implemented by a hypervisor hosting the virtual machine instance.

Clause 13. The method of Clause 6, wherein the mapping data includes conditional mappings, each conditional mapping including criteria for evaluating a given file operation to determine whether the conditional mapping is implemented for the given file operation.

Clause 14. One or more non-transitory computer-readable media comprising instructions implementable at a secure compute layer for a hosted computing instance, wherein the secure compute layer is locally addressable by an operating system of the hosted computing instance as a virtualized file system device of the hosted computing instance, wherein the virtualized file system device is associated with a virtualized file system, wherein the secure compute layer is implemented in memory that is inaccessible to the hosted computing instance, and wherein the instructions, when implemented by the secure compute layer, cause the secure compute layer to:
- obtain mapping data mapping individual file system objects, within the virtualized file system, to one or more network-accessible storage services of a plurality of network-accessible storage services;
- obtain a file operation from the hosted computing instance;
- determine, from the mapping data, at least one network-accessible storage service of the plurality of network-accessible storage services that is mapped to a file system object identified within the file operation;
- translate the file operation into a corresponding call to at least one network-accessible storage service determined from the mapping data;
- submit the corresponding call to the at least one network-accessible storage service;
- obtain a result from the corresponding call; and
- return the result of the corresponding calls to the hosted computing instance as a response to the file operation.

Clause 15. The one or more non-transitory computer-readable media of Clause 14, wherein the file operation is a write operation, wherein the at least one network-accessible storage service comprises a first network-accessible storage service and a second network-accessible storage service, and wherein submitting the one or more corresponding calls for the file operation to the at least one network-accessible storage service comprises writing data to the first and second network-accessible storage services in parallel.

Clause 16. The one or more non-transitory computer-readable media of Clause 14, wherein the file operation is a write operation, wherein the at least one network-accessible storage service comprises a first network-accessible storage service and a second network-accessible storage service, and wherein submitting the one or more corresponding calls for to the at least one network-accessible storage service comprises initially staging written data to the first network-accessible storage service and subsequently committing the data to the second network-accessible storage service.

Clause 17. The one or more non-transitory computer-readable media of Clause 14, wherein the at least one network-accessible storage service comprises a first network-accessible storage service and a second network-accessible storage service, and wherein submitting the one or more corresponding calls to the at least one network-accessible storage service comprises:
- submitting a first call to the first network-accessible storage service;
- determining that the first call has failed; and
- responsive to failure of the first call, submitting a second call to the second network-accessible storage service.

Clause 18. The one or more non-transitory computer-readable media of Clause 14, wherein the file operation is a read operation, wherein the result from the one or more corresponding calls is data of a file being read in the read operation, and wherein the instructions further cause the secure compute layer to:
- cache the data of the file in local storage of the secure compute layer as a cached copy;
- obtain from the hosted computing instance a subsequent read operation for the file; and
- return a result to the subsequent read operation based on the cached copy.

Clause 19. The one or more non-transitory computer-readable media of Clause 14, wherein the hosted computing instance is a virtual machine instance or a bare metal instance.

Clause 20. The one or more non-transitory computer-readable media of Clause 14, wherein the mapping data includes conditional mappings, each conditional mapping including criteria for evaluating a given file operation to determine whether the conditional mapping is implemented for the given file operation.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
    a block store server hosting a network-accessible block storage system; and
    a compute server comprising:
        a first subset of hardware comprising a first processor and a first memory, wherein the first subset of hardware hosts a virtual machine instance, wherein the virtual machine instance comprises an operating system and a software application; and
        an offload card comprising a second subset of hardware, wherein the second subset of hardware includes a second processor and a second memory, and wherein the second subset of hardware hosts a secure compute layer, and wherein the secure compute layer is:
            locally addressable by the operating system of the virtual machine instance as a virtualized file system device, and
            configured to:
                obtain a command to mount the virtualized file system device as a virtualized file system,
                in response to the command to mount the virtualized file system device as the virtualized file system, establish a communication session with the network-accessible block storage system,
                accept, from the software application, a file operation addressed to the virtualized file system, wherein the file operation is unsupported by the network-accessible block storage system,
                determine a block storage operation that is to be performed on the network-accessible block storage system to satisfy the file operation, wherein the block storage operation is supported by the network-accessible block storage system,
                translate the file operation addressed to the virtualized file system into, the block storage operation,
                submit the block storage operation to the network-accessible block storage system via the communication session,
                obtain a result associated with the block storage operation from the network-accessible block storage system, and
                return the result associated with the block storage operation to the software application as a response from the virtualized file system.

2. The system of claim 1, wherein the file operation is generated during execution of the software application in user space of the operating system, and wherein the file operation is passed to the virtualized file system by a virtual file system (VFS) layer of the operating system.

3. The system of claim 1, wherein the file operation is specified by the operating system.

4. The system of claim 1, wherein the network-accessible block storage system is a cloud-based block storage system.

5. A method implemented at a secure compute layer for a hosted computing instance, wherein the secure compute layer is (i) locally addressable by an operating system of the hosted computing instance as a virtualized file system device, and (ii) implemented in memory that is inaccessible to the hosted computing instance, and wherein the method comprises:
    obtaining a command to mount the virtualized file system device as a virtualized file system;
    in response to the command to mount the virtualized file system device as the virtualized file system, establishing a communication session with a network-accessible block storage system;
    accepting, from a software application of the hosted computing instance, a file operation addressed to the virtualized file system, wherein the file operation is unsupported by the network-accessible block storage system;
    determining a block storage operation that is to be performed on the network-accessible block storage system to satisfy the file operation, wherein the block storage operation is supported by the network-accessible block storage system;
    translating the file operation addressed to the virtualized file system into the block storage operation;
    submitting the block storage operation to the network-accessible block storage system via a network interface;
    obtaining, via the network interface, a result associated with the block storage operation from the network-accessible block storage system; and
    returning the result to the software application as a response from the virtualized file system.

6. The method of claim 5, wherein the hosted computing instance is hosted by a first processor and a first memory of a host computing device, and wherein the secure compute layer is implemented by an offload card of the host computing device, wherein the offload card includes a second processor and the memory that is inaccessible to the hosted computing instance.

7. The method of claim 6, wherein the hosted computing instance comprises a virtual machine instance or a bare metal instance.

8. The method of claim 5, wherein the hosted computing instance comprises a virtual machine instance, wherein the hosted computing instance is hosted by a hypervisor, and wherein the hypervisor includes the memory that is inaccessible to the hosted computing instance.

9. The method of claim 5, wherein the file operation comprises a request to read a file, and wherein obtaining the result associated with the block storage operation that satisfies the file operation comprises:
    obtaining, in response to the block storage operation, information identifying a network location storing data of the file; and
    retrieving the data of the file from the network location as the result associated with the block storage operation.

10. The method of claim 5, wherein obtaining the result associated with the block storage operation that satisfies the file operation comprises:
    obtaining, in response to the block storage operation, instructions to conduct specified processing to obtain the result; and
    implementing the specified processing to obtain the result.

11. The method of claim 5, wherein the file operation is addressed to a file system object within the virtualized file system.

12. The method of claim 5, wherein the block storage operation is submitted via the communication session with the network-accessible block storage system.

13. The method of claim 5, wherein the hosted computing instance is authenticated to the network-accessible block storage system within the communication session based on information obtained at the secure compute layer independent of information obtained from the hosted computing instance.

14. One or more non-transitory computer-readable media storing instructions implementable at a secure compute layer for a hosted computing instance, wherein the secure compute layer is (i) locally addressable by an operating system of the hosted computing instance as a virtualized file system device, and (ii) implemented in memory that is inaccessible to the hosted computing instance, and wherein the instructions, when implemented by the secure compute layer, cause the secure compute layer to:
- obtain a command to mount the virtualized file system device as a virtualized file system;
- in response to the command to mount the virtualized file system device as the virtualized file system, establish a communication session with a network-accessible block storage system;
- accept, from a software application of the hosted computing instance, a file operation addressed to the virtualized file system, wherein the file operation is unsupported by the network-accessible block storage system;
- determine a block storage operation that is to be performed on the network-accessible block storage system to satisfy the file operation, wherein the block storage operation is supported by the network-accessible block storage system;
- translate the file operation addressed to the virtualized file system into the block storage operation;
- submit the block storage operation to the network-accessible block storage system via a network interface;
- obtain, via the network interface, a result associated with the block storage operation from the network-accessible block storage system; and
- return the result to the software application as a response from the virtualized file system.

15. The one or more non-transitory computer-readable media of claim 14, storing further instructions that, when implemented by the secure compute layer, cause the secure compute layer to identify the network-accessible block storage system from a configuration of the hosted computing instance.

16. The one or more non-transitory computer-readable media of claim 14, wherein the hosted computing instance is authenticated to the network-accessible block storage system based on information obtained at the secure compute layer independent of information obtained from the hosted computing instance.

17. The one or more non-transitory computer-readable media of claim 14, wherein the file operation comprises a request to read a file, and wherein to obtain the result associated with the block storage operation that satisfies the file operation, the one or more non-transitory computer-readable media stores further instructions that, when implemented by the secure compute layer, cause the secure compute layer to:
- obtain, in response to the block storage operation, information identifying a network location storing data of the file; and
- retrieve the data of the file from the network location as the result associated with the block storage operation.

18. The one or more non-transitory computer-readable media of claim 14, wherein to obtain the result associated with the block storage operation that satisfies the file operation, the one or more non-transitory computer-readable media stores further instructions that, when implemented by the secure compute layer, cause the secure compute layer to:
- obtain in response to the block storage operation, instructions to conduct specified processing to obtain the result; and
- implement the specified processing to obtain the result.

19. The one or more non-transitory computer-readable media of claim 14, wherein the file operation is addressed to a file system object within the virtualized file system.

* * * * *